US010713525B2

(12) United States Patent
Matsumoto

(10) Patent No.: US 10,713,525 B2
(45) **Date of Patent: *Jul. 14, 2020**

(54) IMAGE PROCESSING DEVICE AND METHOD TO OBTAIN A 360° IMAGE WITHOUT REMAPPING

(71) Applicant: SONY CORPORATION, Tokyo (JP)

(72) Inventor: Kazuteru Matsumoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 97 days.

This patent is subject to a terminal disclaimer.

(21) Appl. No.: 14/888,210

(22) PCT Filed: Mar. 28, 2014

(86) PCT No.: PCT/JP2014/059110
§ 371 (c)(1),
(2) Date: Oct. 30, 2015

(87) PCT Pub. No.: WO2014/185170
PCT Pub. Date: Nov. 20, 2014

(65) Prior Publication Data

US 2016/0078311 A1 Mar. 17, 2016

(30) Foreign Application Priority Data

May 16, 2013 (JP) ................................. 2013-103671

(51) Int. Cl.
*G06K 9/52* (2006.01)
*G06T 3/60* (2006.01)
(Continued)

(52) U.S. Cl.
CPC ............ *G06K 9/525* (2013.01); *G06T 3/0018* (2013.01); *G06T 3/60* (2013.01); *G06T 7/238* (2017.01);
(Continued)

(58) Field of Classification Search
CPC . G06T 2207/10016; G06T 2207/20021; G06T 3/60; G06T 7/248; G06T 7/73;
(Continued)

(56) References Cited

U.S. PATENT DOCUMENTS 7,463,305 B2 * 12/2008 Wada .................. F16M 11/105 348/218.1
8,369,621 B2 * 2/2013 Nomura ............... G06K 9/4642 382/190
(Continued)

FOREIGN PATENT DOCUMENTS

CN 102395994 A 3/2012
JP 11-331827 A 11/1999
(Continued)

OTHER PUBLICATIONS

Stratmann, Irem. "Omnidirectional imaging and optical flow." Omnidirectional Vision, 2002. Proceedings. Third Workshop on. IEEE, 2002.*
(Continued)

*Primary Examiner* — Pinalben Patel
(74) *Attorney, Agent, or Firm* — Chip Law Group

(57) ABSTRACT

[Object] To obtain a more useful image when an image including a 360° view around the camera is used without being remapped.
[Solution] Provided is an image processing device including: an image acquisition unit that acquires a 360° image; and a rotational angle computation unit that computes a rotational angle of the 360° image in a manner that a reference point included in the 360° image is positioned in a designated orientation with respect to a center of the 360° image.

14 Claims, 23 Drawing Sheets

(51) Int. Cl.

| | |
|---|---|
| ***G06T 7/246*** | (2017.01) |
| ***G06T 7/73*** | (2017.01) |
| ***G06T 7/238*** | (2017.01) |
| ***G06T 3/00*** | (2006.01) |
| ***H04N 5/232*** | (2006.01) |
| ***H04N 5/91*** | (2006.01) |

(52) U.S. Cl.
CPC ................ *G06T 7/248* (2017.01); *G06T 7/73* (2017.01); *H04N 5/23238* (2013.01); *H04N 5/91* (2013.01); *G06T 2207/10016* (2013.01); *G06T 2207/20021* (2013.01)

(58) Field of Classification Search
CPC ....... G06T 7/238; G06T 3/0018; G06K 9/525; H04N 5/23238; H04N 5/91
See application file for complete search history.

(56) References Cited

U.S. PATENT DOCUMENTS

| | | | | |
|---|---|---|---|---|
| 8,724,018 | B2 * | 5/2014 | Yoshizumi | H04N 5/2251 348/373 |
| 9,070,191 | B2 * | 6/2015 | Murashita | G06T 7/0042 |
| 9,185,287 | B2 * | 11/2015 | Sento | G03B 37/02 |
| 9,514,526 | B2 * | 12/2016 | Taguchi | G06T 7/0004 |
| 9,769,347 | B2 * | 9/2017 | Chen | H04N 1/04 |
| 9,800,780 | B2 * | 10/2017 | Matsumoto | H04N 5/23229 |
| 10,284,794 | B1 * | 5/2019 | Francois | H04N 5/3415 |
| 2004/0233461 | A1 * | 11/2004 | Armstrong | G01C 11/025 356/620 |
| 2005/0043956 | A1 * | 2/2005 | Aoyama | G10L 15/22 704/276 |
| 2006/0002474 | A1 * | 1/2006 | Au | H04N 19/57 375/240.16 |
| 2006/0039693 | A1 * | 2/2006 | Lee | H04N 5/232 396/322 |
| 2006/0062306 | A1 * | 3/2006 | Ha | H04N 19/56 375/240.16 |
| 2006/0153472 | A1 * | 7/2006 | Sakata | H04N 5/23248 382/255 |
| 2006/0215930 | A1 * | 9/2006 | Terui | G06T 3/4038 382/284 |
| 2006/0274926 | A1 * | 12/2006 | Singh | A61B 6/14 382/131 |
| 2008/0180535 | A1 * | 7/2008 | Habuka | G06T 7/20 348/208.4 |
| 2010/0111429 | A1 * | 5/2010 | Wang | G06T 3/4038 382/233 |
| 2010/0111499 | A1 * | 5/2010 | Tsurumi | H04N 5/144 386/224 |
| 2010/0141772 | A1 * | 6/2010 | Inaguma | G01S 3/7864 348/169 |
| 2010/0283778 | A1 * | 11/2010 | Tapang | G06T 19/006 345/419 |
| 2011/0261076 | A1 * | 10/2011 | Shinohara | A63F 13/10 345/650 |
| 2012/0045149 | A1 * | 2/2012 | Arai | H04N 7/183 382/296 |
| 2012/0293609 | A1 * | 11/2012 | Doepke | H04N 5/23238 348/36 |
| 2012/0293610 | A1 * | 11/2012 | Doepke | H04N 5/23238 348/36 |
| 2012/0294549 | A1 * | 11/2012 | Doepke | G06T 3/4038 382/294 |
| 2013/0307982 | A1 * | 11/2013 | Kawai | G06T 7/80 348/148 |
| 2015/0054745 | A1 * | 2/2015 | Cheng | G06F 3/0304 345/158 |
| 2016/0073020 | A1 * | 3/2016 | Matsumoto | G06T 3/60 348/222.1 |

FOREIGN PATENT DOCUMENTS

| | | | |
|---|---|---|---|
| JP | 2011331827 | A | 11/1999 |
| JP | 2004228737 | A | 8/2004 |
| JP | 2005269419 | A | 9/2005 |
| JP | 2006-285546 | A | 10/2006 |
| JP | 4545093 | B | 9/2010 |
| JP | 2011-040898 | A | 2/2011 |
| JP | 2011064566 | A | 3/2011 |
| JP | 2012226645 | A | 11/2012 |
| WO | 2011114610 | A | 9/2011 |

OTHER PUBLICATIONS

Yang et al., Real-time face and facial feature tracking and applications, AVSP'98 International Conference on Auditory-Visual Speech Processing, 1998.*

Yang et al., Real-time face and facial feature tracking and applications, AVSP'98 International Conference on Auditory-Visual Speech Processing, 1998 (Year: 1998).*

Partial Supplementary European Search Report of EP Application No. 14798199.7, dated Dec. 7, 2016, 7 pages.

Sun, et al., "Calibration and Correction for Omnidirectional Image with a Fisheye Lens", IEEE, Fourth International Conference on Natural Computation, 2008, pp. 134-137.

Irem Stratmann, "Omnidirectional Optical Flow and Visual Motion Detection for Autonomous Robot Navigation", University of Osnabruck Department of Mathematics/Informatics, Oct. 16, 2007, 138 pages.

Irem Stratmann, "Omnidirectional Imaging and Optical Flow", IEEE, Proceedings of Third Workshop on Omnidirectional Vision, Jun. 2, 2002, 8 pages.

Office Action for CN Patent Application No. 201480026181.X, dated Aug. 3, 2017, 06 pages of Office Action and 11 pages of English Translation.

"Omnidirectional Imaging and Optical Flow", The Computer Society, 2002, 08 pages.

Extended European Search Report of EP Patent Application No. 14798199.7, dated May 8, 2017, 14 pages.

Nishiguchi, et al.,"A Sensor-Fusion Method for Detecting a Speaking Student", International Conference on Multimedia and Expo, IEEE, 2003, pp. 129-132.

Irem Stratman, "Omnidirectional Imaging and Optical Flow", Proceedings of the Third Workshop on Omnidirectional Vision (OMNIVIS'02), IEEE, Computer Society, 2002, pp. 1-8.

Sun, et al., "Calibration and Correction for Omnidirectional Image with a Fisheye Lens", Fourth International Conference on Natural Computation, IEEE, Computer Society, 2008, pp. 133-137.

Irem Stratman, "Omnidirectional Optical Flow and Visual Motion Detection for Autonomous Robot Navigation", Oct. 16, 2007, pp. 1-138.

* cited by examiner

IMAGE PROCESSING DEVICE AND METHOD TO OBTAIN A 360° IMAGE WITHOUT REMAPPING

TECHNICAL FIELD

The present disclosure relates to an image processing device, an image processing method, and a program.

BACKGROUND ART

By using a lens and camera with a special structure, an image including a 360° view around the camera may be obtained. Technologies for processing and utilizing such images are being variously proposed. For example, Patent Literature 1 describes a technology that computes the three-dimensional coordinates of an object by using the data of feature points extracted from a moving image taken using a full-perimeter camera. Also, Patent Literature 2 describes a technology that converts an image taken using a fisheye lens into a remapped image that has been remapped onto a cylindrical surface, and detects information such as the distance to an object on the basis of the remapped image.

CITATION LIST

Patent Literature

Patent Literature 1: Japanese Patent No. 4545093
Patent Literature 2: JP 2012-226645A

SUMMARY OF INVENTION

Technical Problem

Distortion occurs in images taken using a full-perimeter camera as above or a fisheye lens, for example. Consequently, technologies for utilizing such images mainly remap the images to remove the effects of distortion, or compute object coordinates or distances on the assumption of distortion. In other words, technology for using images including a 360° view around the camera as-is has not been adequately proposed heretofore.

Accordingly, the present disclosure proposes a new and improved image processing device, image processing method, and program making it possible to obtain a more useful image when an image including a 360° view around the camera is used without being remapped.

Solution to Problem

According to the present disclosure, there is provided an image processing device including: an image acquisition unit that acquires a 360° image; and a rotational angle computation unit that computes a rotational angle of the 360° image in a manner that a reference point included in the 360° image is positioned in a designated orientation with respect to a center of the 360° image.

According to the present disclosure, there is provided an image processing method including: acquiring a 360° image; and computing, by a processor, a rotational angle of the 360° image in a manner that a reference point included in the 360° image is positioned in a designated orientation with respect to a center of the 360° image.

According to the present disclosure, there is provided a program causing a computer to realize: a function of acquiring a 360° image; and a function of a processor computing a rotational angle of the 360° image in a manner that a reference point included in the 360° image is positioned in a designated orientation with respect to a center of the 360° image.

In a 360° image including a 360° view around the camera, it is difficult to uniquely define directions such as up and down like in an ordinary taken image. Accordingly, by rotating the 360° image so that a reference point configured according to some kind of reference is positioned in a designated orientation, a useful image may be obtained, in which an appropriate direction depending on the content of the image is easily perceived.

Advantageous Effects of Invention

According to the present disclosure as described above, a more useful image may be obtained when an image including a 360° view around the camera is used without being remapped.

DESCRIPTION OF EMBODIMENTS

Figure 1:
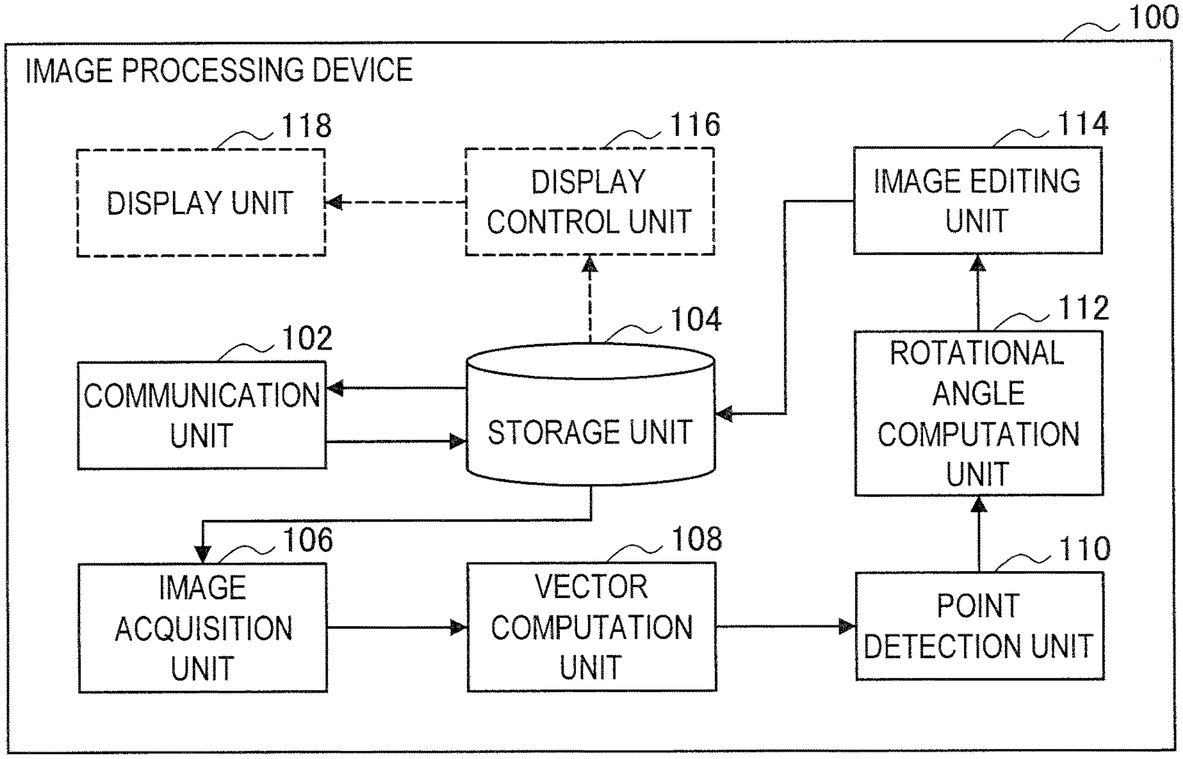
FIG. 1 is a block diagram illustrating a schematic functional configuration of an image processing device according to a first embodiment of the present disclosure.

Hereinafter, preferred embodiments of the present disclosure will be described in detail with reference to the appended drawings. Note that, in the present description and the drawings, elements that have substantially the same function and structure are denoted with the same reference signs, and repeated explanation is omitted.

Hereinafter, the description will proceed in the following order.

1. First embodiment
1-1. Functional configuration
1-2. Specific example of point of origin and point of detection
1-3. Movement direction estimation
1-4. Example of rotation of taken image
2. Second embodiment
3. Third embodiment
4. Fourth embodiment
5. Fifth embodiment
5-1. Functional configuration
5-2. Example of rotational angle computation
6. Sixth embodiment
7. Seventh embodiment
7-1. Functional configuration
7-2. Example of rotational angle computation
8. Eighth embodiment
9. Hardware configuration
10. Supplemental remarks

1. First Embodiment

(1-1. Functional Configuration)

FIG. 1 is a block diagram illustrating a schematic functional configuration of an image processing device according to a first embodiment of the present disclosure. Referring to FIG. 1, the image processing device 100 includes a communication unit 102, a storage unit 104, an image acquisition unit 106, a vector computation unit 108, a point detection unit 110, a rotational angle computation unit 112, and an image editing unit 114. Additionally, the image processing device 100 may also include a display control unit 116 and a display unit 118.

In the present embodiment, the image processing device 100 is a device that acquires taken images from another device via a network, and edits the acquired images. The image processing device 100 may also transmit edited images to another device via a network, store the edited images in a storage unit, or display the edited images by itself.

The image processing device 100 may be, for example, a terminal device such as various kinds of personal computers (PCs), a tablet, a mobile phone (including a smartphone), a game console, or a media player, and may also be a server that provides a service to a terminal device via a network. The image processing device 100 is realized by the hardware configuration of an information processing device discussed later, for example. When the image processing device 100 is a server, the functions of the image processing device 100 may also be realized by the cooperative action of multiple information processing devices connected over a network. Hereinafter, each of the structural elements will be described further.

The communication unit 102 is realized by a communication device, for example, and communicates with other devices via various wired or wireless networks. For example, the communication unit 102 receives data of taken images from another device, and stores the received data in the storage unit 104. As another example, the communication unit 102 transmits the data of images edited on the image processing device 100 and stored in the storage unit 104 to another device. Furthermore, although not illustrated, when the image processing device 100 is a server, the communication unit 102 receives a command such as a process request transmitted from a terminal device that receives a service, and provides the command to the components of the image processing device 100.

The storage unit 104 is realized by the combination of a storage device and various types of memory, for example, and temporarily or permanently stores various data used by the image processing device 100. For example, the storage unit 104 at least temporarily stores the data of taken images received from another device, and provides the stored data to the image acquisition unit 106 as necessary. As another example, the storage unit 104 at least temporarily stores the data of images edited by the image editing unit 114, and provides the stored data to the communication unit 102 for transmission to another device as necessary. Alternatively, the storage unit 104 may also provide the data of edited images to the display control unit 116 for display.

The image acquisition unit 106 is realized by a central processing unit (CPU) operating according to a program stored in memory, for example, and acquires the data of taken images stored in the storage unit 104. Herein, the taken images whose data is acquired by the image acquisition unit 106 are images taken in chronological succession via a fisheye lens. Herein, since the taken images taken via a fisheye lens include a 360° view around the camera that includes the fisheye lens, such images may also be designated 360° images. These images may constitute a series of frames as a moving image, or be two or more still images taken independently, for example.

The vector computation unit 108 is realized by a CPU operating according to a program stored in memory, for example, and computes motion vectors from taken images acquired by the image acquisition unit 106. For example, the vector computation unit 108 computes motion vectors by dividing the taken images into blocks of designated size, and executing block matching with the taken images positioned chronologically before and after. Note that a variety of other established techniques besides the above may also be used to compute motion vectors.

At this point, the vector computation unit 108 may also compute motion vectors in two stages depending on a process result from the point detection unit 110 discussed later. In this case, for example, the vector computation unit 108 first computes motion vectors at a first block size for the taken images in entirety. The computed motion vectors are then provided to the point detection unit 110 for the moment, and in the point detection unit 110, a search region is configured on the basis of the motion vectors. Next, the vector computation unit 108 computes motion vectors at a second block size smaller than the first block size for the search region in the taken images (nearby portions may also be included), and provides the computed motion vectors to the point detection unit 110. In the search region, the point detection unit 110 searches for a point of origin or a point of convergence using the motion vectors computed at the smaller second block size. In this way, by reducing the number of times that block matching is executed in the vector computation unit 108, the processing load on the image processing device 100 as a whole may be reduced.

Note that in another embodiment, the vector computation unit 108 may also not be included in the image processing device 100. In other words, the image processing device 100 does not necessarily need to compute motion vectors itself. For example, motion vectors may be received by the communication unit 102 as data computed by another device, and stored in the storage unit 104. In this case, the vector computation unit 108 may be replaced by a vector acquisition unit that reads out from the storage unit 104 the data of motion vectors corresponding to the taken images.

The point detection unit 110 is realized by a CPU operating according to a program stored in memory, for example, and detects a point of origin or a point of convergence of the motion vectors computed by the vector computation unit 108. As discussed later, with taken images taken in chronological succession via a fisheye lens, a point or origin or a point of convergence of the motion vectors appears depending on the camera movement direction. More specifically, the point detection unit 110 may detect both a point of origin and a point of convergence in a peripheral portion of the taken images, or detect one of either a point of origin or a point of convergence in a central portion of the taken images.

Herein, the point detection unit 110 may also detect a point of origin or a point of convergence in two stages, in correspondence with the two-stage computation of motion vectors by the vector computation unit 108 discussed above. In this case, for example, the point detection unit 110 first configures a search region in the taken images on the basis of the motion vectors computed at the first block size for the taken images in entirety. For the search region, a region in which the motion vector magnitudes are relatively small, or a region in which the directions of relatively many motion vectors intersect may be configured, for example. This reflects a property of taken images taken in chronological succession via a fisheye lens, according to which the motion vector magnitudes become smaller in the vicinity of a point of origin or a point of convergence, and the directions of many motion vectors concentrate at a point of origin or a point of convergence. The point detection unit 110 provides information about the search region to the vector computation unit 108, and the vector computation unit 108 computes motion vectors at the smaller second block size for the search region (nearby portions may also be included). Furthermore, the point detection unit 110 searches for a point of origin or a point of convergence inside the search region, on the basis of the motion vectors computed at the second block size.

Alternatively, even if the vector computation unit 108 does not compute the motion vectors in two stages, the point detection unit 110 may also configure a search region similarly to the above example, and search for a point of origin or a point of convergence inside the search region. In this case, the point detection unit 110 may configure a search region by extracting the motion vectors computed by the vector computation unit 108 at a first granularity, and searching for a point of origin or a point of convergence inside the search region by extracting the motion vectors at a second granularity finer than the first granularity. Likewise in this case, for the search region, a region in which the motion vector magnitudes are relatively small, or a region in which the directions of relatively many motion vectors intersect may be configured, for example.

Note that a more specific example of a point of origin and a point of convergence of motion vectors detected by the point detection unit 110 will be discussed later.

The rotational angle computation unit 112 is realized by a CPU operating according to a program stored in memory, for example. When the point detection unit 110 detects a point of origin in a peripheral portion of the taken images, the rotational angle computation unit 112 computes the rotational angle of the taken images at which the point of origin is positioned in a designated orientation with respect to the center of the taken images. More specifically, the rotational angle computation unit 112 may compute a rotational angle so that the point of origin is positioned below the center of the taken images. As discussed later, when the taken images are images taken by pointing the fisheye lens in a vertical direction, for example, such a rotational angle may be the angle by which to rotate the taken images so that the taken images flowing by in conjunction with the movement of the camera are observed more naturally. Herein, the rotational angle computation unit 112 may also be said to use the point of origin as a reference point, and compute the rotational angle so that the reference point is positioned in a designated orientation with respect to the center of the taken images. As discussed later, in the present embodiment, the point of origin obtained as a result of analysis of the taken images is estimated to be the point of regard in the taken images, and the rotational angle computation unit 112 computes a rotational angle using the estimated point of regard as a reference point.

The image editing unit 114 is realized by a CPU operating according to a program stored in memory, for example, and rotates the taken images according to the rotational angle computed by the rotational angle computation unit 112. As discussed above, when a point of origin is detected in a peripheral portion of the taken images, the rotational angle computation unit 112 may compute a rotational angle so that the point of origin is positioned in a designated orientation with respect to the center of the taken images. Consequently, when a point of origin is detected in a peripheral portion of the taken images, the image editing unit 114 may also be said to rotate the taken images so that the point of origin is positioned in a designated orientation with respect to the center of the taken images. More specifically, the image editing unit 114 may rotate the taken images so that the point of origin is positioned below the center of the taken images. As demonstrated by the more specific example of a point of origin and a point of convergence of motion vectors discussed later, such a rotation process may also be said to be a process based on an estimation that the taken images are images taken while moving from a point of convergence towards a point of origin.

The display control unit 116 is realized by a CPU operating according to a program stored in memory, for example, and controls the display unit 118, which is realized by an output device such as various types of display, for example, to display images based on data read out from the storage unit 104. Herein, the storage unit 104 may store images edited by the image editing unit 114, or more specifically, taken images rotated by the image editing unit 114 according to a rotational angle computed by the rotational angle computation unit 112. Consequently, the display control unit 116 may also be said to cause the display unit 118 to display images generated as a result of the process from the image acquisition unit 106 to the image editing unit 114.

(1-2. Specific Example of Point of Origin and Point of Detection)

A more specific example of a point of origin and a point of convergence of motion vectors detected by the point detection unit 110 of the image processing device 100 discussed above will be described further, with reference to FIGS. 2 to 4.

Figure 2:
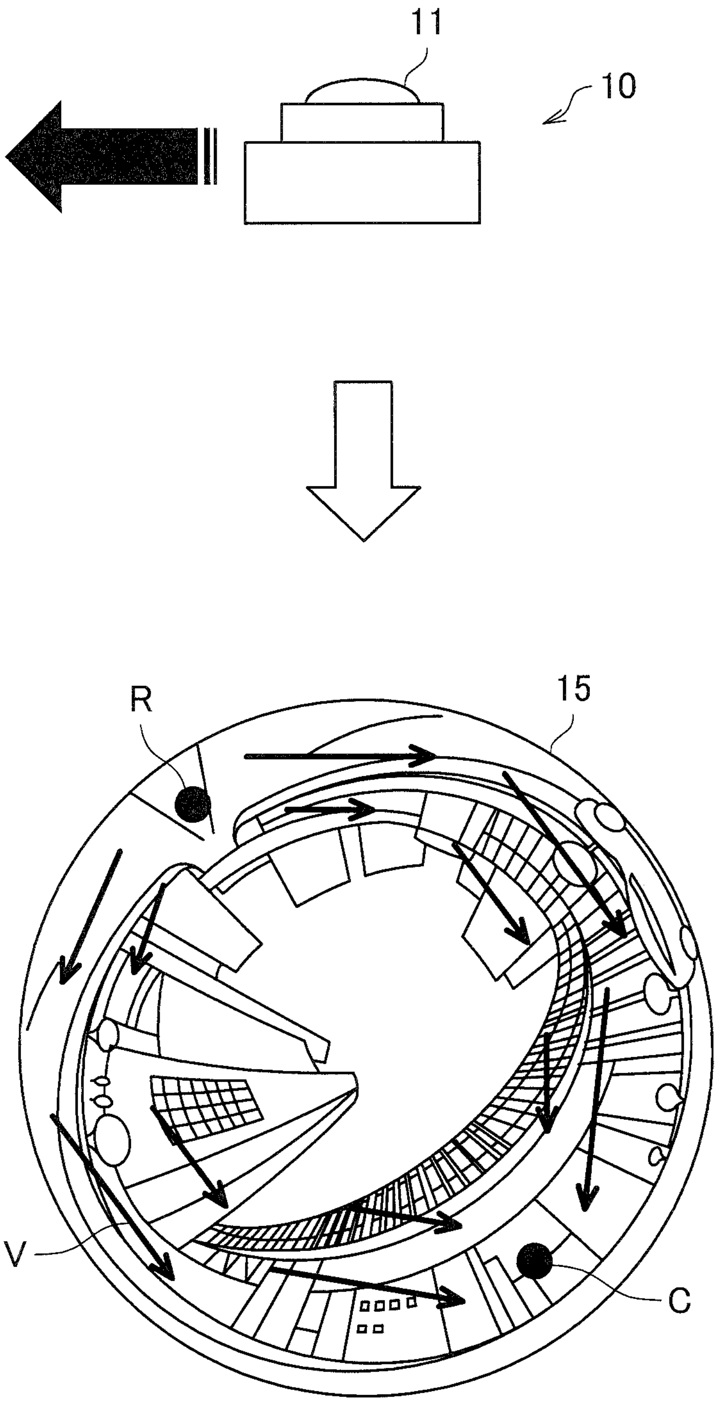
FIG. 2 is a diagram for explaining an example of a taken image taken by pointing the camera in a vertical direction according to a first embodiment of the present disclosure.

FIG. 2 is a diagram for explaining an example of a taken image taken by pointing the camera in a vertical direction according to the first embodiment of the present disclosure. FIG. 2 illustrates an example of a taken image 15 taken by pointing a camera 10 in a vertical direction. The camera 10 includes a fisheye lens 11, and the optical axis direction of the fisheye lens 11 is an approximately vertical direction. Additionally, the camera 10 is moving in an approximately horizontal direction, or in other words a direction perpendicular to the optical axis direction of the fisheye lens 11.

In this case, in the taken image 15 both a point of origin R and a point of convergence C of the motion vectors V appear in the peripheral portion. When the optical axis direction of the fisheye lens 11 is an approximately vertical direction, the central portion of the taken image 15 corresponds to the area above the camera 10, while the peripheral portion of the taken image 15 corresponds to the area around the camera 10. Herein, the taken image 15 is a 360° image including a 360° view around the camera 10. If the camera 10 moves in an approximately horizontal direction while in this state, in taken images 15 taken in chronological succession, a certain point in the peripheral portion, or in other words the image originating from the point corresponding to the direction the camera 10 is heading towards, will be divided mainly onto either side, flow along the peripheral portion, and converge at the point in the peripheral portion on the opposite side with respect to the center of the taken image 15, or in other words the point corresponding to the direction the camera 10 is heading away from. In this way, a point of origin R and a point of convergence C of the motion vectors V appear. In this case, the observer's point of regard on the taken image 15 may be estimated to be the destination the camera 10 is heading towards, or in other words, the point of origin R.

As discussed above, the point detection unit 110 of the image processing device 100 may detect such a point of origin R and a point of convergence C. Herein, the point detection unit 110 may also utilize the regularity of the position relationship between the point of origin R and the point of convergence C to increase the efficiency of the detection process. For example, if the point of origin R is discovered in a first part of the peripheral portion of the taken image 15, the point of convergence C likely exists in a second part positioned on the opposite side of the first part with respect to the center of the taken image 15. Accordingly, the point detection unit 110 may conduct a search for the point of convergence C which prioritizes the second part, or which is limited to the second part. Conversely, if the point of convergence C is discovered in a first part of the peripheral portion of the taken image 15, the point of origin R likely exists in a second part positioned on the opposite side of the first part with respect to the center of the taken image 15. Accordingly, the point detection unit 110 may conduct a search for the point of origin R which prioritizes the second part, or which is limited to the second part.

More specifically, for example, the point detection unit 110 may search for the point of origin R or the point of convergence C by analyzing the motion vectors in order from the edge of the taken image 15, and when the point of origin R or the point of convergence C is discovered in the peripheral portion of the taken image 15, the point detection unit 110 may treat that part as the first part, and cause the area of search to jump to the second part corresponding to the first part (the part on the opposite side with respect to the center of the taken image 15). In this way, by reducing the number of times that motion vector analysis is executed by the point detection unit 110, the processing load on the image processing device 100 as a whole may be reduced.

Note that when the optical axis direction of the fisheye lens 11 is tilted with respect to the vertical direction by a certain degree or more, only one of either the point of origin R or the point of convergence C may appear in the peripheral portion of the taken image 15, while the other point may lie outside the range of the taken image 15. In this case, even if the point of origin R or the point of convergence C is discovered in the first part as above, the paired point of convergence C or point of origin R will not be discovered in the second part. However, in this case, since the point of convergence C or the point of origin R may also be considered to not exist in a part other than the second part, the point detection unit 110 may end the search if the point of convergence C or the point of origin R is not discovered in the second part.

Figure 3:
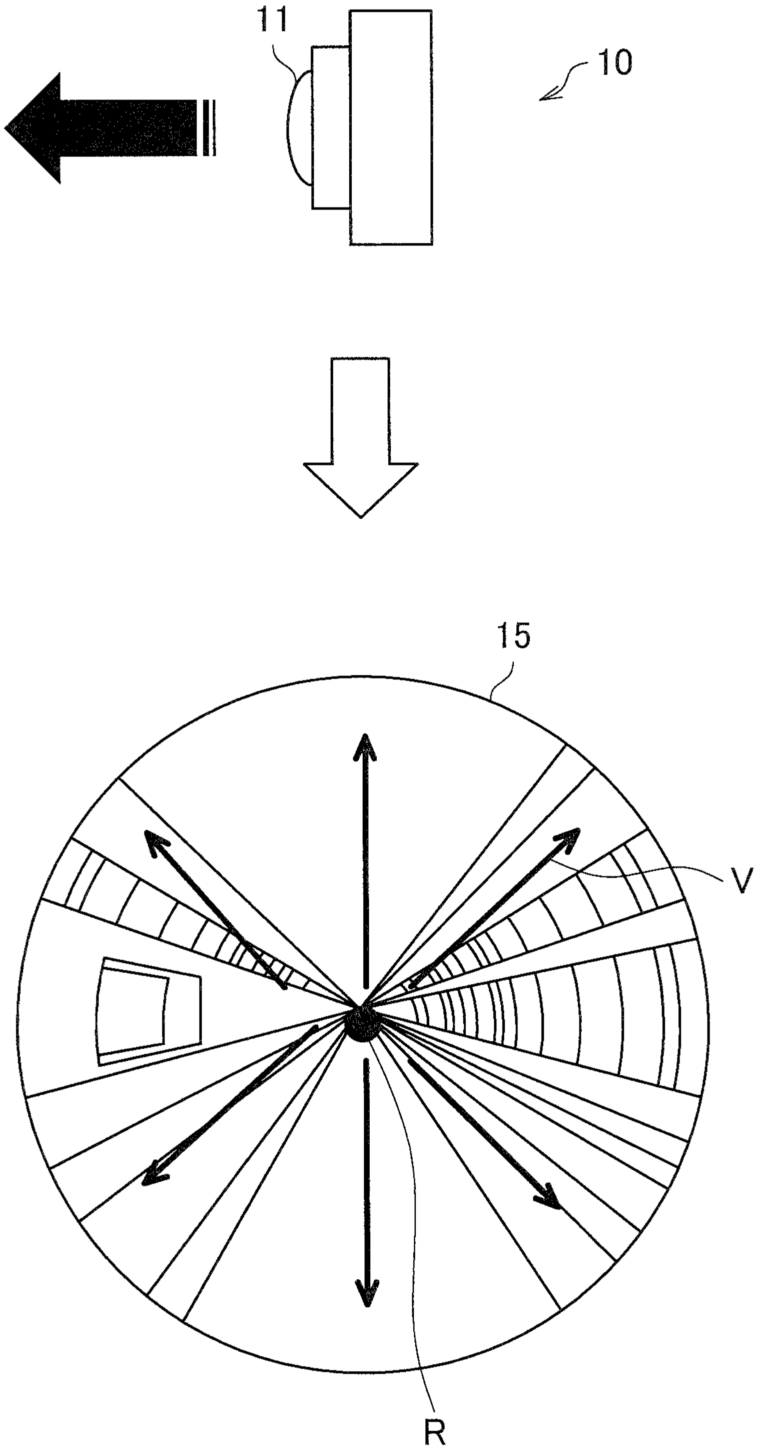
FIG. 3 is a diagram for explaining a first example of a taken image taken by pointing the camera in a horizontal direction according to a first embodiment of the present disclosure.

FIG. 3 is a diagram for explaining a first example of a taken image taken by pointing the camera in a horizontal direction according to the first embodiment of the present disclosure. FIG. 3 illustrates an example of a taken image 15 taken by pointing the camera 10 in a horizontal direction. The camera 10 includes a fisheye lens 11, and the optical axis direction of the fisheye lens 11 is an approximately horizontal direction. In addition, the camera 10 is moving in an approximately horizontal direction, with the fisheye lens 11 leading in front.

In this case, in the taken image 15, only a point of origin R of the motion vectors V appears in the central portion. When the camera 10 is moving with the fisheye lens 11 leading in front, the central portion of the taken image 15 corresponds to the area in front of the camera 10, while the peripheral portion of the taken image 15 corresponds to the area above and below as well as to the left and the right of the camera 10. If the camera 10 moves forward while in this state, in taken images 15 taken in chronological succession, a certain point in the central portion, or in other words the image originating from the point corresponding to the direction the camera 10 is heading towards, flows towards the peripheral portion, and continues on to spread out at the edges of the taken image 15. In this way, only a point of origin R of the motion vectors V appears. In this case, the observer's point of regard on the taken image 15 may be estimated to be the destination the camera 10 is heading towards, or in other words, the point of origin R.

Figure 4:
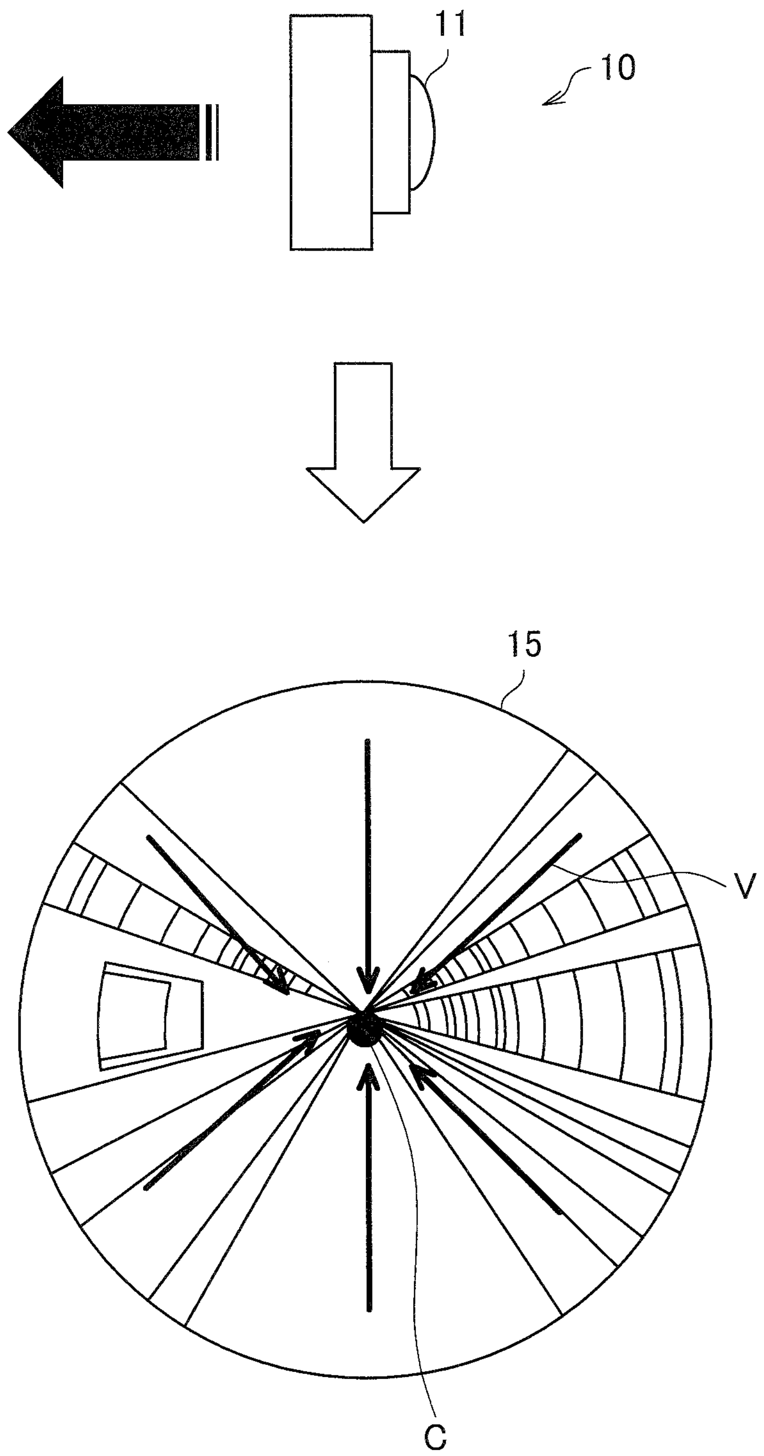
FIG. 4 is a diagram for explaining a second example of a taken image taken by pointing the camera in a horizontal direction according to a first embodiment of the present disclosure.

FIG. 4 is a diagram for explaining a second example of a taken image taken by pointing the camera in a horizontal direction according to the first embodiment of the present disclosure. FIG. 4 also illustrates an example of a taken image 15 taken by pointing the camera 10 in a horizontal direction. The camera 10 includes a fisheye lens 11, and the optical axis direction of the fisheye lens 11 is an approximately horizontal direction. In addition, the camera 10 is moving in an approximately horizontal direction, with the fisheye lens 11 trailing behind.

In this case, in the taken image 15, only a point of convergence C of the motion vectors V appears in the central portion. When the camera 10 is moving with the fisheye lens 11 trailing behind, the central portion of the taken image 15 corresponds to the area behind the camera 10, while the peripheral portion of the taken image 15 corresponds to the area above and below as well as to the left and the right of the camera 10. If the camera 10 moves forward while in this state, in taken images 15 taken in chronological succession, images appearing from the edges of the taken images 15 flow from the peripheral portion towards the central portion, and converge on a point in the central portion, or in other words the point corresponding to the direction the camera 10 is heading away from. In this way, only a point of convergence C of the motion vectors V appears. In this case, the observer's point of regard on the taken image 15 may be estimated to be the origin the camera 10 is heading away from, or in other words, the point of convergence C.

(1-3. Movement Direction Estimation)

Figure 5:
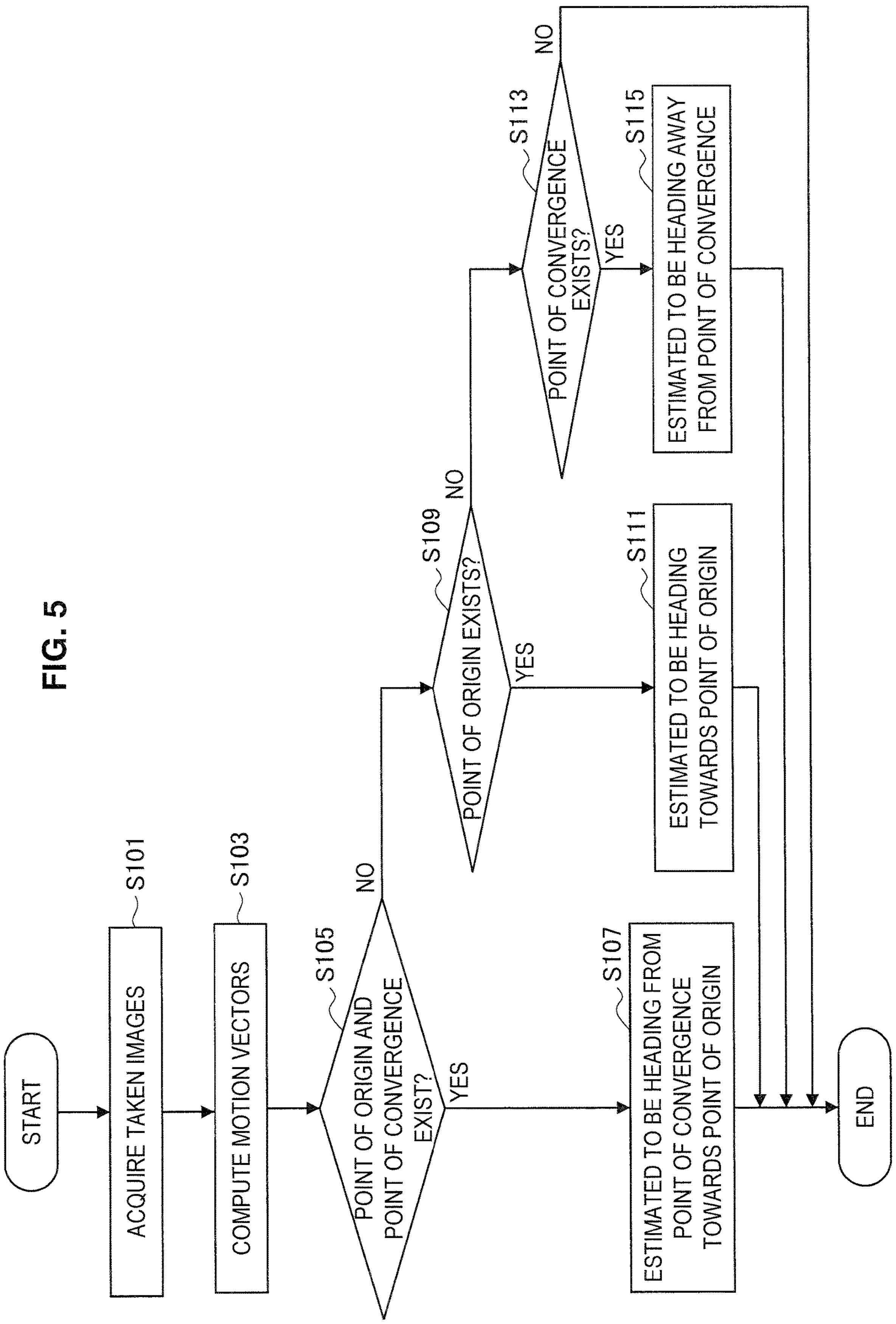
FIG. 5 is a flowchart that conceptually illustrates estimation of the movement direction according to a first embodiment of the present disclosure.

FIG. 5 is a flowchart that conceptually illustrates estimation of the movement direction according to the first embodiment of the present disclosure. In the present embodiment, when the point of origin of the motion vectors is detected in the peripheral portion of the taken images, the image editing unit 114 of the image processing device 100 may rotate the taken images so that the point of origin is positioned in a designated orientation with respect to the center of the taken images. Such a process may also be said to be a process based on an estimation that the taken images are images taken while moving from the point of convergence towards the point of origin, as described above. In this case, in several embodiments of the present disclosure, a process based on an estimation of the movement direction of the taken images may be executed. FIG. 5 conceptually illustrates an example of such an estimation.

Note that the estimation of the movement direction of the taken images described below is not necessarily limited to being executed explicitly on the image processing device 100. In other words, the estimation of the movement direction of the taken images is not necessarily included among the functions realized by the image processing device 100, or among the steps executed by the image processing device 100. However, a process executed on the basis of a detection result of a point of origin or a point of convergence by the point detection unit 110, like the process of the above image editing unit 114, for example, may be a process configured in light of the movement direction of the taken images estimated from the detection result.

Referring to FIG. 5, first, the image acquisition unit 106 acquires taken images (step S101). As above, the taken images acquired at this point have been taken in chronological succession via a fisheye lens. Next, the vector computation unit 108 computes motion vectors from the taken images (step S103). Note that although simple processes of the vector computation unit 108 and the point detection unit 110 are illustrated in the drawing, it is also possible to implement options as presented in the above description.

At this point, if, as a result of the point detection unit 110 detecting a point of origin or a point of convergence of the motion vectors, both a point of origin and a point of convergence of the motion vectors exist (step S105, Yes), the taken images are estimated to be images taken while moving from the point of convergence towards the point of origin, like the example illustrated in FIG. 2 (step S107). Note that, as discussed earlier, in consideration of the case in which only one of either the point of origin or the point of convergence appears in the peripheral portion of the taken images because the optical axis direction of the fisheye lens is tilted with respect to the vertical direction or the like, and the other point lies outside the range of the taken images, the condition in step S105 may also be rephrased as "Does a point of convergence or a point of origin exist in the peripheral portion of the taken images?" In this case, the point of convergence and the point of origin referred to in step S107 may include a point that lies outside the range of the taken images.

On the other hand, in the case of No in step S105, if a point of origin exists in the taken images (step S109, Yes), the taken images are estimated to be images taken while moving towards the point of origin, or in other words, approaching the point of origin, like the example illustrated in FIG. 3 (step S111). Also, in the case of No in step S109, if a point of convergence exists in the taken images (step S113, Yes), the taken images are estimated to be images taken while moving away from the point of convergence, or in other words, like the example illustrated in FIG. 4 (step S115). Note that, although not illustrated in the drawings, in the case of No in step S115 also, or in other words, if the point detection unit 110 does not detect either a point of origin or a point of convergence, the taken images may be estimated to be images taken without moving.

Applying the estimation of movement direction as described above to the first embodiment described earlier yields the following.

First, like the example illustrated in FIG. 2, if the taken images are estimated to be images taken while moving from the point of convergence towards the point of origin (step S107), the image editing unit 114 may rotate the taken images so that the point of origin is positioned in a designated orientation with respect to the center of the taken images. As discussed later, this is because taken images taken while moving with the fisheye lens pointed in a vertical direction are more easily observed when the direction of forward motion is positioned in a designated orientation with respect to the center of the images.

On the other hand, like the examples illustrated in FIGS. 3 and 4, if the taken images are estimated to be images taken while moving towards the point of origin, or away from the point of convergence (step S111 or S115), the image editing unit 114 does not rotate the taken images. This is because in images like these examples, the top, bottom, left, and right are already fixed, and rotation is not necessary.

(1-4. Example of Rotation of Taken Image)

A more specific example of the rotation of taken images by the image editing unit 114 of the image processing device 100 discussed above will be described further with reference to FIGS. 6 and 7. Note that the taken images given in the example below are all treated as images taken while moving from the point of convergence towards the point of origin, like the example illustrated in FIG. 2.

Figure 6:
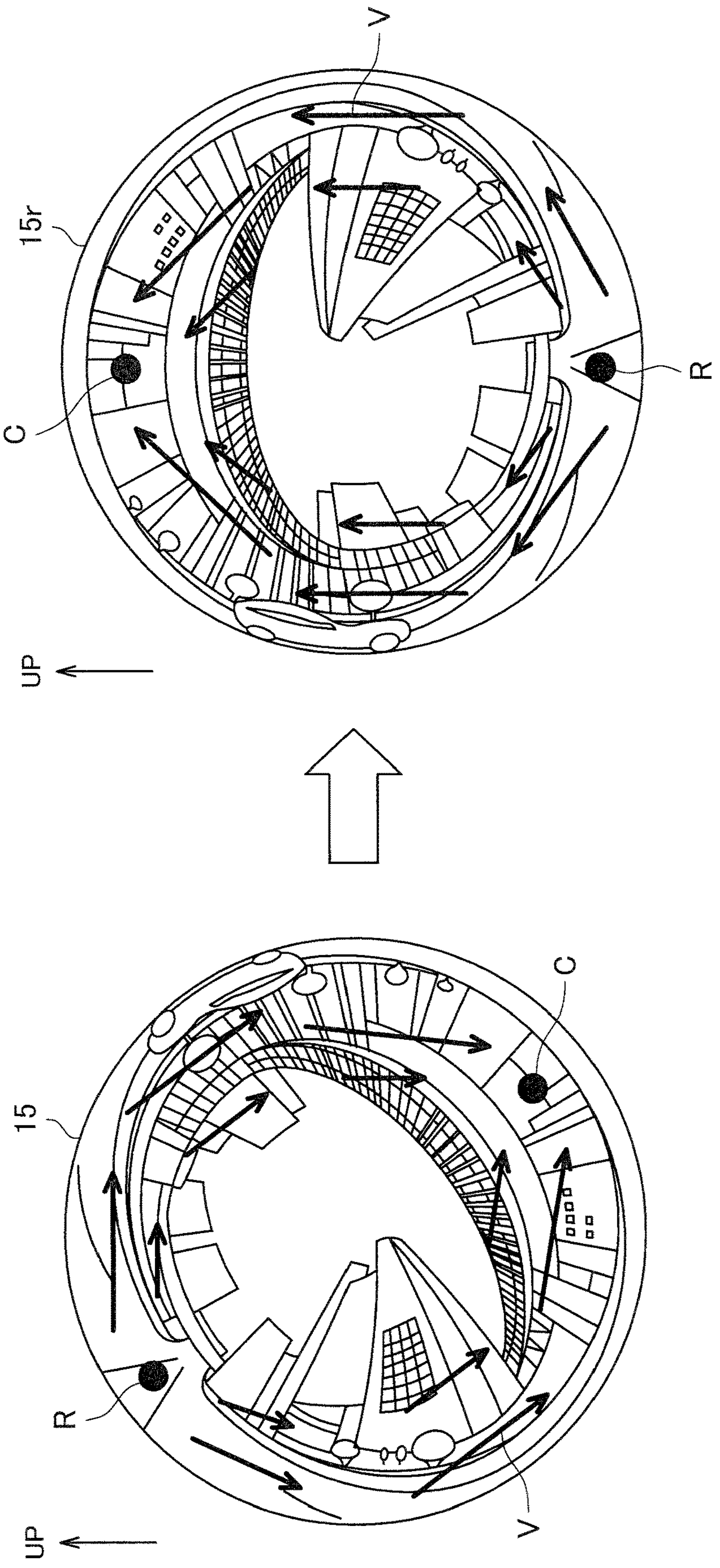
FIG. 6 is a diagram for explaining a first example of rotation of a taken image according to a first embodiment of the present disclosure.

FIG. 6 is a diagram for explaining a first example of rotation of a taken image according to the first embodiment of the present disclosure. FIG. 6 illustrates a taken image 15 in which a point of origin R and a point of convergence C exist for motion vectors V. If the taken image 15 is observed as-is, the image divides mainly on either side of the taken image 15 and flows from the point of origin R in the upper-left to the point of convergence C in the lower-right. Observation of an image in such a state is empirically known to make observers experience discomfort in many cases.

Accordingly, in the illustrated example, the rotational angle computation unit 112 computes a rotational angle so that the point of origin R is positioned below the center of the taken image 15, and the image editing unit 114 rotates the taken image 15 according to the computed rotational angle. The rotated taken image 15 is illustrated as the taken image 15*r*. In the taken image 15*r*, the image flows from the point of origin R at the bottom to the point of convergence C at the top, and thus observers are less likely to experience discomfort.

In order to address the discomfort of observers due to the orientation of taken images taken via a fisheye lens, it is also conceivable to lock the orientation when installing the camera onto a means of transportation such as a vehicle, or detect the camera orientation with a sensor or the like separate from the camera. However, by rotating the taken images after taking the images as above, more naturally observable taken images may be provided, irrespective of the camera orientation when taking images.

Figure 7:
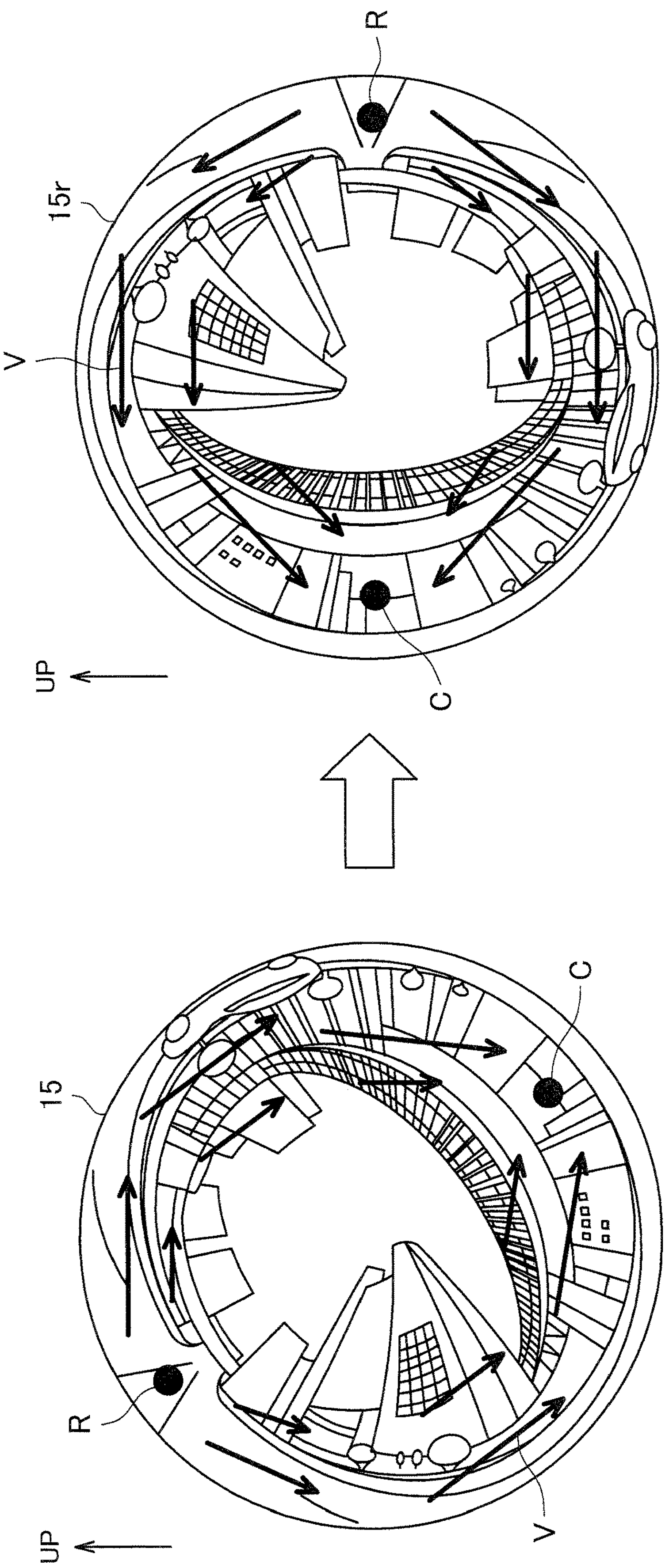
FIG. 7 is a diagram for explaining a second example of rotation of a taken image according to a first embodiment of the present disclosure.

FIG. 7 is a diagram for explaining a second example of rotation of a taken image according to the first embodiment of the present disclosure. FIG. 7 likewise illustrates a taken image 15 in which a point of origin R and a point of convergence C exist for motion vectors V, similarly to FIG. 6. In the illustrated example, the rotational angle computation unit 112 computes a rotational angle so that the direction joining the point of origin R and the point of convergence C matches the left-and-right direction, and the image editing unit 114 rotates the taken image 15 according to the computed rotational angle. In the rotated taken image 15*r*, the image flows from the point of origin R on the right to the point of convergence C on the left. Such an orientation of the taken image 15*r* may be suitable when the observer's attention is on the flowing image itself rather than the destination the camera is heading towards, that is, the point of origin R.

2. Second Embodiment

Next, a second embodiment of the present disclosure will be described with reference to FIGS. 8 and 9. In the present embodiment, functions similar to the image processing device 100 according to the first embodiment above are realized by being distributed between first and second image processing devices.

Figure 8:
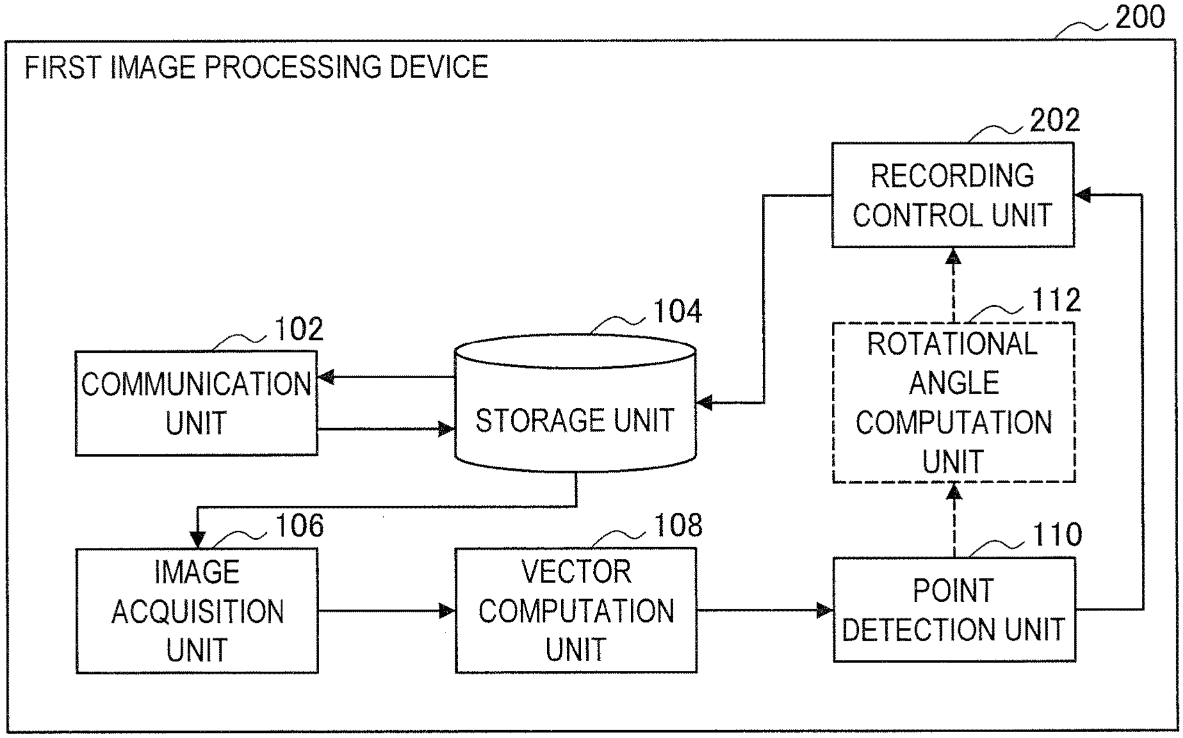
FIG. 8 is a block diagram illustrating a schematic functional configuration of a first image processing device according to a second embodiment of the present disclosure.
Figure 9:
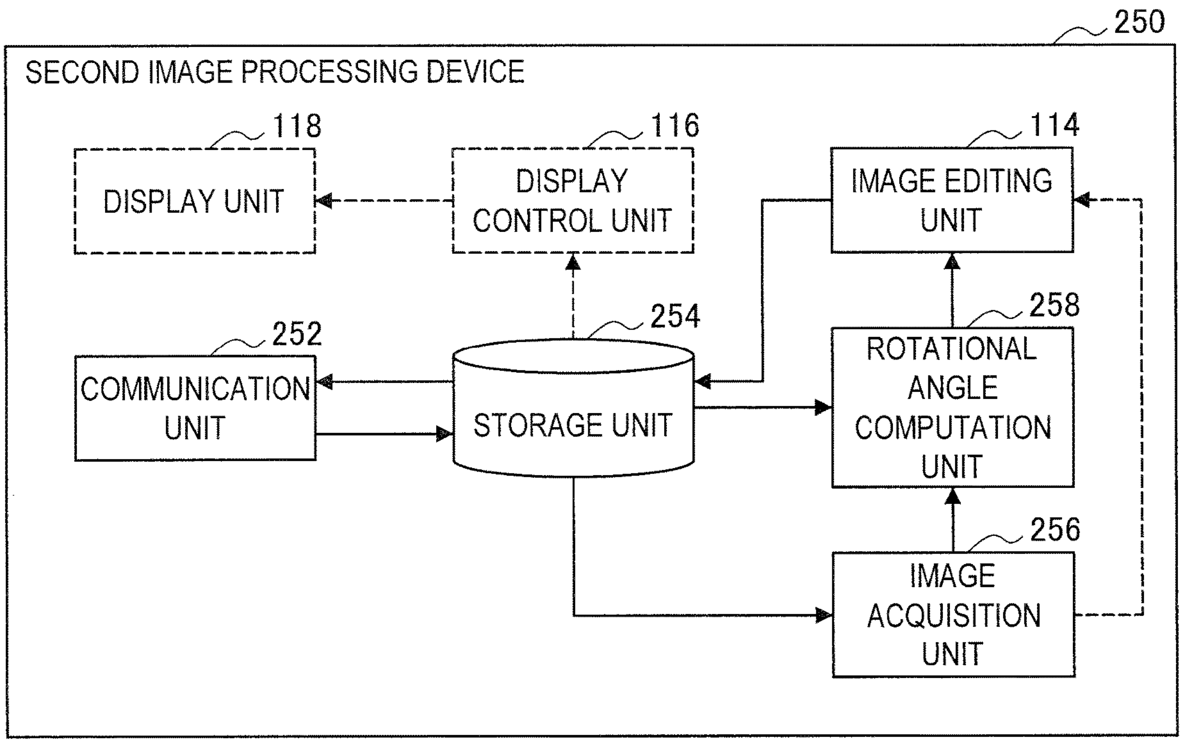
FIG. 9 is a block diagram illustrating a schematic functional configuration of a second image processing device according to a second embodiment of the present disclosure.

FIG. 8 is a block diagram illustrating a schematic functional configuration of a first image processing device according to the second embodiment of the present disclosure, and FIG. 9 is a block diagram illustrating a schematic functional configuration of a second image processing device according to the second embodiment of the present disclosure.

Referring to FIG. 8, the first image processing device 200 includes a communication unit 102, a storage unit 104, an image acquisition unit 106, a vector computation unit 108, a point detection unit 110, and a recording control unit 202. Additionally, the first image processing device 200 may also include a rotational angle computation unit 112.

In the present embodiment, the first image processing device 200 is a device that acquires taken images from another device via a network, and records the acquired images together with metadata. The first image processing device 200 receives images with associated metadata from the second image processing device 250 via the network.

Referring to FIG. 9, the second image processing device 250 includes a communication unit 252, a storage unit 254, an image acquisition unit 256, a rotational angle computation unit 258, and an image editing unit 114. Additionally, the second image processing device 250 may also include a display control unit 116 and a display unit 118.

In the present embodiment, the second image processing device 250 is a device that acquires images with associated metadata from the first image processing device 200 via the network, and edits the acquired images according to the metadata. The second image processing device 250 may also transmit edited images to another device via a network, store the edited images in a storage unit, or display the edited images by itself.

The first image processing device 200 and the second image processing device 250 may be, for example, a terminal device such as various kinds of PCs, a tablet, a mobile phone (including a smartphone), a game console, or a media player, and may also be a server that provides a service to a terminal device via a network. The first image processing device 200 and the second image processing device 250 are realized by the hardware configuration of an information processing device discussed later, for example. When the first image processing device 200 or the second image processing device 250 is a server, the functions of the device may also be realized by the cooperative action of multiple information processing devices connected over a network. Hereinafter, each of the structural elements will be described further. Note that functional configurations similar to those described in the first embodiment above will be denoted with common signs, and thus duplicate description thereof will be reduced or omitted.

The recording control unit 202 is realized by a CPU operating according to a program stored in memory, for example, and records, in association with taken images, metadata based on a detection result of a point of origin or a point of convergence by the point detection unit 110. For example, the recording control unit 202 may record a position within the taken images of a detected point of origin or point of convergence. Also, when the first image processing device 200 includes the rotational angle computation unit 112, the recording control unit 202 may also record a rotational angle of taken images computed by the rotational angle computation unit 112.

The communication unit 252 is realized by a communication device, for example, and communicates with other devices, including the first image processing device 200, via various wired or wireless networks. For example, the communication unit 252 receives and stores in the storage unit 254 the data of taken images from the first image processing device 200, together with metadata. As another example, the communication unit 252 transmits the data of images edited on the second image processing device 250 and stored in the storage unit 254 to another device. Furthermore, although not illustrated, when the second image processing device 250 is a server, the communication unit 252 receives a command such as a process request transmitted from a terminal device that receives a service, and provides the command to the components of the second image processing device 250.

The storage unit 254 is realized by the combination of a storage device and various types of memory, for example, and temporarily or permanently stores various data used by the second image processing device 250. For example, the storage unit 254 at least temporarily stores the data and metadata of taken images received from the first image processing device, and provides the stored data and metadata to the image acquisition unit 256 or the rotational angle computation unit 258 as necessary. As another example, the storage unit 254 at least temporarily stores the data of images edited by the image editing unit 114, and provides the stored data to the communication unit 252 for transmission to another device as necessary. Alternatively, the storage unit 254 may also provide the data of edited images to the display control unit 116 for display.

The image acquisition unit 256 is realized by a CPU operating according to a program stored in memory, for example, and acquires the data of taken images stored in the storage unit 254. Herein, the taken images whose data is acquired by the image acquisition unit 256 are images taken in chronological succession via a fisheye lens. These images may constitute a series of frames as a moving image, or be two or more still images taken independently, for example.

The rotational angle computation unit 258 may be provided when the first image processing device 200 does not include the rotational angle computation unit 112. The rotational angle computation unit 258 is realized by a CPU operating according to a program stored in memory, for example. When a point of origin is detected in a peripheral portion of the taken images, the rotational angle computation unit 258 computes a rotational angle of the taken images so that the point of origin is positioned in a designated orientation with respect to the center of the taken images. In the present embodiment, since the point detection unit 110 is included in the first image processing device 200, the rotational angle computation unit 258 reads out from the storage unit 254 the metadata provided together with the taken images by the first image processing device 200, and on the basis of the metadata, specifies the position within the taken images of the point of origin.

3. Third Embodiment

Next, a third embodiment of the present disclosure will be described with reference to FIG. 10. In the present embodiment, functions similar to the image processing device 100 above are realized in an imaging device that executes imaging. In other words, in the present embodiment, an imaging device also functions as an image processing device.

Figure 10:
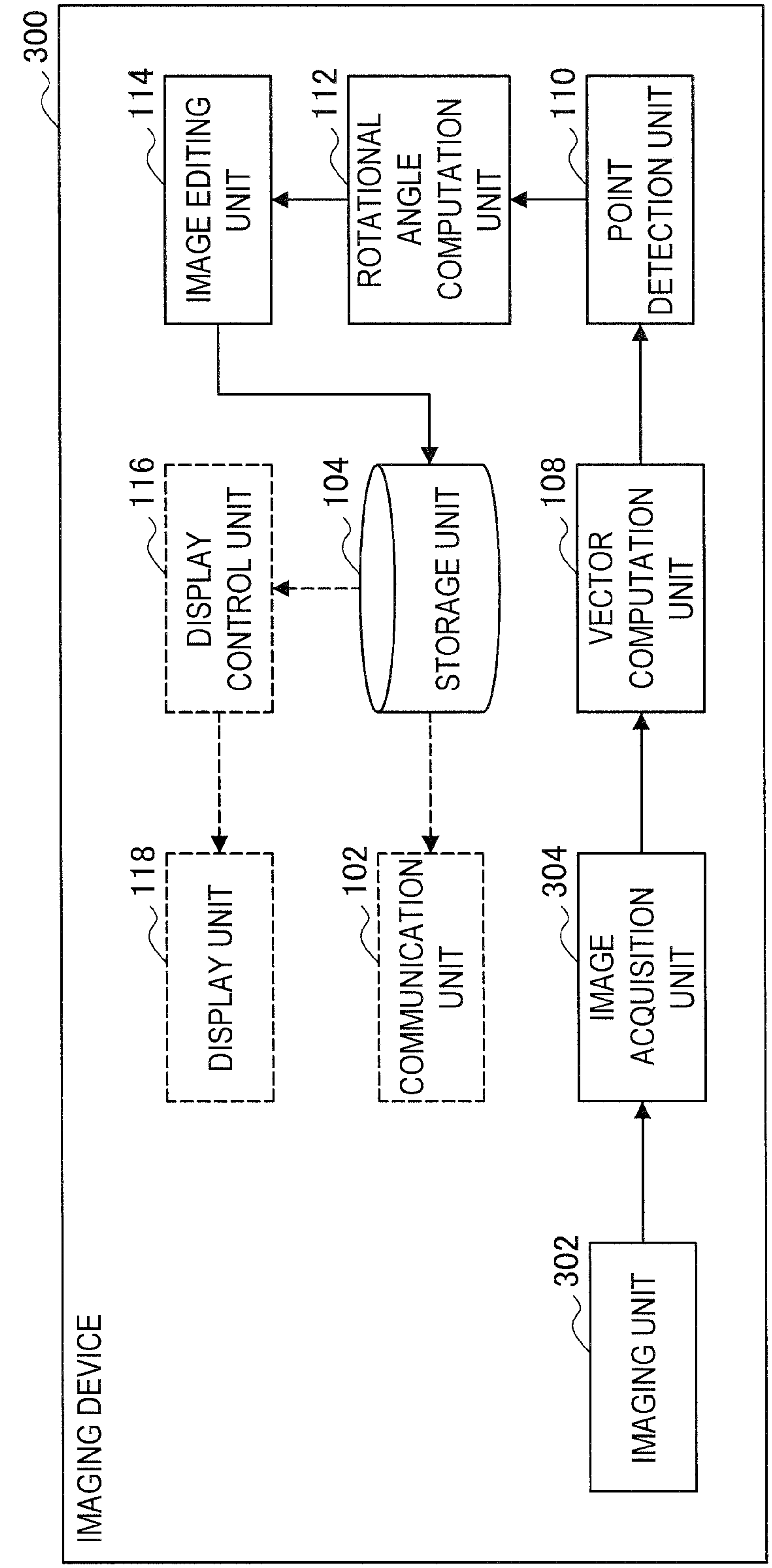
FIG. 10 is a block diagram illustrating a schematic functional configuration of an imaging device according to a third embodiment of the present disclosure.

FIG. 10 is a block diagram illustrating a schematic functional configuration of an imaging device according to the third embodiment of the present disclosure. Referring to FIG. 10, the imaging device 300 includes an imaging unit 302, an image acquisition unit 304, a storage unit 104, a vector computation unit 108, a point detection unit 110, a rotational angle computation unit 112, and an image editing unit 114. The imaging device 300 additionally may include a communication unit 102. Also, the imaging device 300 additionally may include a display control unit 116 and a display unit 118.

In the present embodiment, the imaging device 300 is a device that executes imaging itself to acquire taken images, and edits the acquired images. The imaging device 300 may also transmit edited images to another device via a network, store the edited images in a storage unit, or display the edited images by itself.

The imaging device 300 may be a terminal device whose primary function is an imaging function, like a digital camera, for example, but may also be a terminal device including an imaging function as an additional function, like a tablet, a mobile phone (including a smartphone), or a game console. The imaging device 300 is realized by the hardware configuration of an information processing device discussed later, for example. Hereinafter, each of the structural elements will be described further. Note that functional configurations similar to those described in the first embodiment above will be denoted with common signs, and thus duplicate description thereof will be reduced or omitted.

The imaging unit 302 is realized by an imaging device including an image sensor, such as a complementary metal-oxide-semiconductor (CMOS) sensor, for example, and an image processing circuit that executes processes such as gradation and tone adjustment, a noise reduction process, and size conversion on the raw data generated by the image sensor, and then generates image data in various formats, such as Joint Photographic Experts Group (JPEG), for example. The imaging unit 302 includes a fisheye lens as a lens for controlling the formation of an object image on the image sensor, and provides to the image acquisition unit 304 taken images taken in chronological succession via the fisheye lens. The fisheye lens may also be removably attached to the imaging unit 302, such as an interchangeable lens in the case of a digital camera, or a lens attachment or the like in the case of another terminal device, for example.

The image acquisition unit 304 is realized by a CPU operating according to a program stored in memory, for example, and acquires the data of taken images taken by the imaging unit 302. Herein, the taken images whose data is acquired by the image acquisition unit 304 are images taken in chronological succession via the fisheye lens of the imaging unit 302. These images may constitute a series of frames as a moving image, or be two or more still images taken independently, for example.

4. Fourth Embodiment

Next, a fourth embodiment of the present disclosure will be described with reference to FIGS. 11 and 12. In the present embodiment, functions similar to the imaging device 300 according to the third embodiment above are realized by being distributed between an imaging device and an image processing device.

Figure 11:
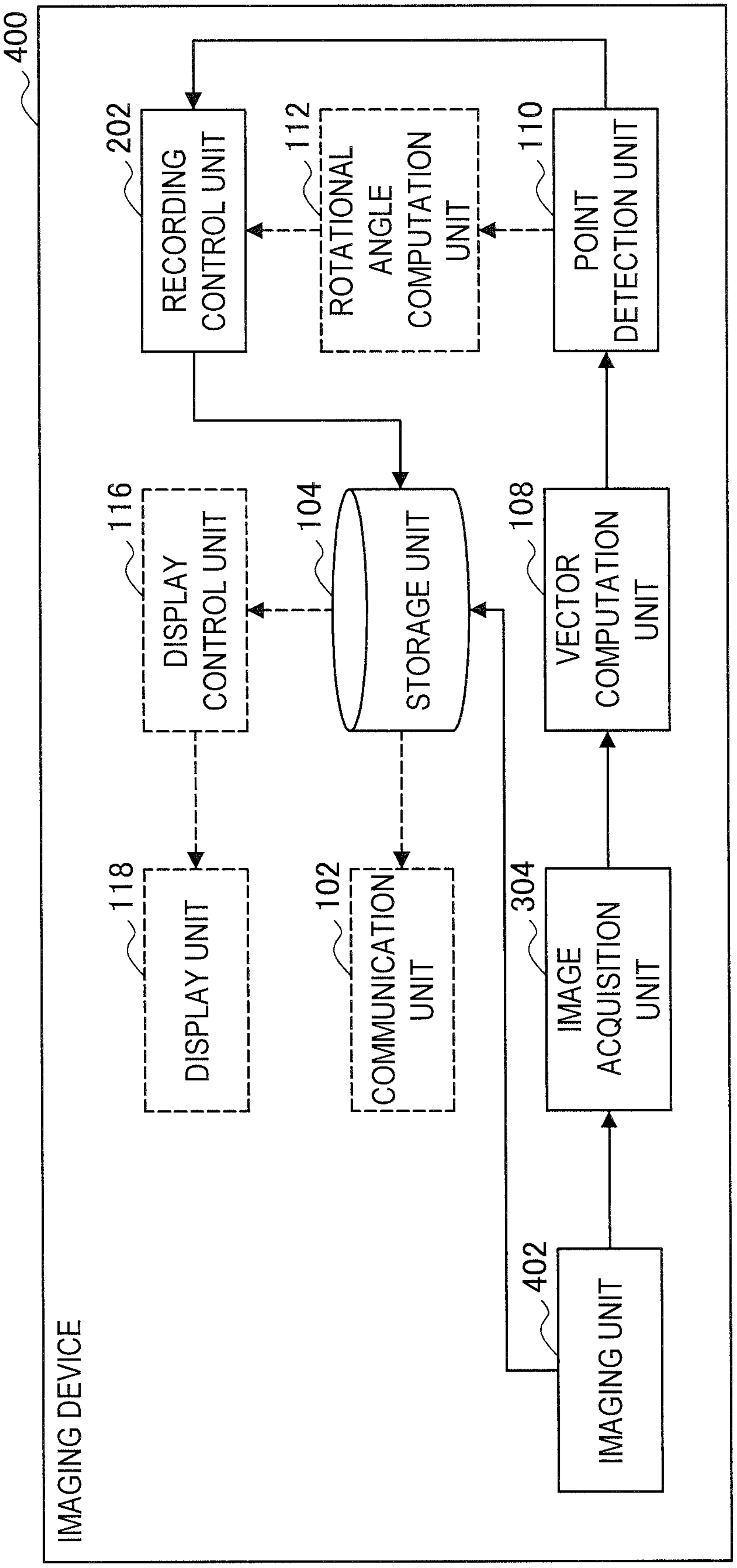
FIG. 11 is a block diagram illustrating a schematic functional configuration of an imaging device according to a fourth embodiment of the present disclosure.
Figure 12:
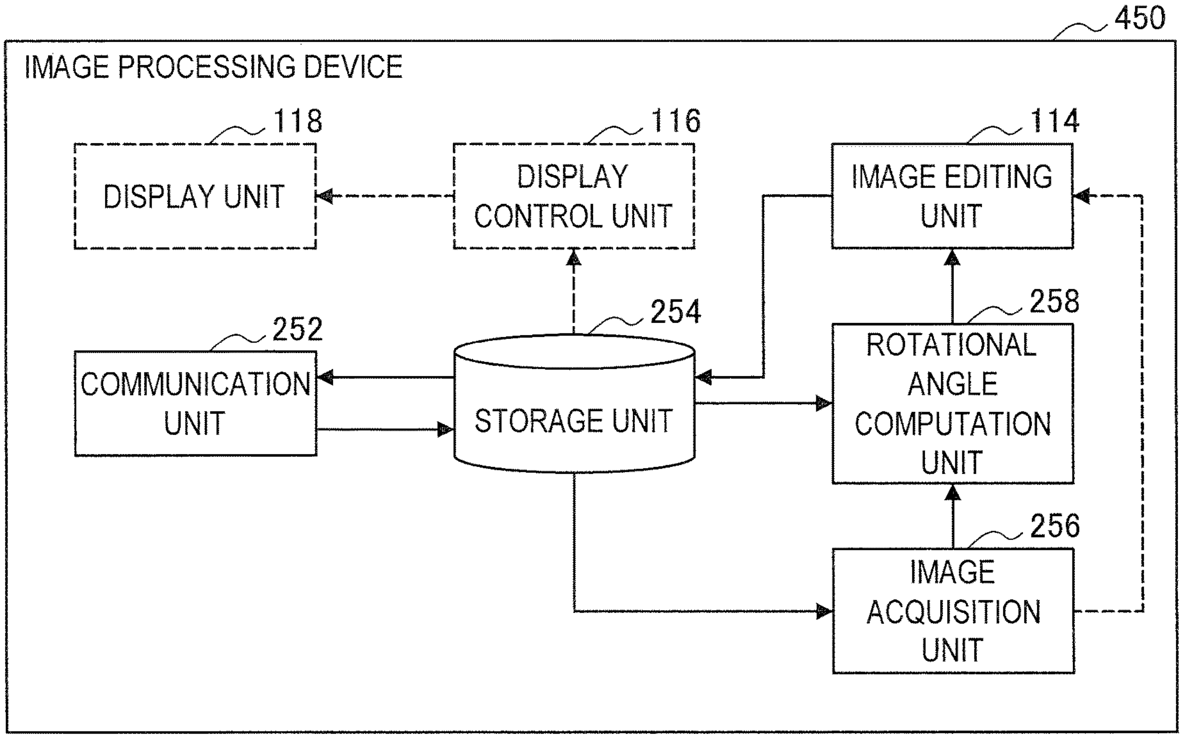
FIG. 12 is a block diagram illustrating a schematic functional configuration of an image processing device according to a fourth embodiment of the present disclosure.

FIG. 11 is a block diagram illustrating a schematic functional configuration of an imaging processing device according to the fourth embodiment of the present disclosure, and FIG. 12 is a block diagram illustrating a schematic functional configuration of an image processing device according to the fourth embodiment of the present disclosure.

Referring to FIG. 11, the imaging device 400 includes an imaging unit 402, an image acquisition unit 304, a storage unit 104, a vector computation unit 108, a point detection unit 110, and a recording control unit 202. The imaging device 400 additionally may include a communication unit 102 or a rotational angle computation unit 112. Also, the imaging device 400 additionally may include a display control unit 116 and a display unit 118.

In the present embodiment, the imaging device 400 is a device that executes imaging itself to acquire taken images, and records the acquired images together with metadata. The imaging device 400 transfers images with associated metadata to the image processing device 450 via a removable recording medium included in the storage unit 104, or transmits images with associated metadata to the image processing device 450 from the communication unit 102 via a network.

Referring to FIG. 12, the image processing device 450 includes a communication unit 252, a storage unit 254, an image acquisition unit 256, a rotational angle computation unit 258, and an image editing unit 114. Additionally, the image processing device 450 may also include a display control unit 116 and a display unit 118. Note that the functional configuration of the image processing device 450 is similar to the functional configuration of the second image processing device 250 according to the second embodiment above.

In the present embodiment, the image processing device 450 is a device that acquires images with associated metadata from the imaging device 400 via the network, and edits the acquired images according to the metadata. The image processing device 450 may also transmit edited images to another device via a network, store the edited images in a storage unit, or display the edited images by itself.

The imaging device 400 may be a terminal device whose primary function is an imaging function, like a digital camera, for example, but may also be a terminal device including an imaging function as an additional function, like a tablet, a mobile phone (including a smartphone), or a game console. In addition, the image processing device 450 may be a terminal device such as various kinds of PCs, a tablet, a mobile phone (including a smartphone), a game console, or a media player, and may also be a server that provides a service to a terminal device via a network. The imaging device 400 and the image processing device 450 are realized by the hardware configuration of an information processing device discussed later, for example. When the image processing device 450 is a server, the functions of the image processing device 450 may also be realized by the cooperative action of multiple information processing devices connected over a network. Hereinafter, each of the structural elements will be described further. Note that functional configurations similar to those described in the first to third embodiments above will be denoted with common signs, and thus duplicate description thereof will be reduced or omitted.

The imaging unit 402 has a functional configuration similar to the imaging unit 302 described in the third embodiment above, but the imaging unit 402 not only provides taken images to the image acquisition unit 304, but also stores taken images in the storage unit 104. Metadata is recorded in association with the taken images by the imaging device 400 and the recording control unit 202, but since the editing of the taken images is executed by the image processing device 450 rather than the imaging device 400, the taken images stored in the storage unit 104 may be provided from the imaging unit 402.

5. Fifth Embodiment

Next, a fifth embodiment of the present disclosure will be described with reference to FIGS. 13 to 15. In the present embodiment, a point of regard in taken images is estimated on the basis of a taken image analysis result different from the detection of a point of origin or a point of convergence described in the embodiments above, and the taken images are rotated so that the point of regard is positioned in a designated orientation with respect to the center of the taken images.

(5-1. Functional Configuration)

Figure 13:
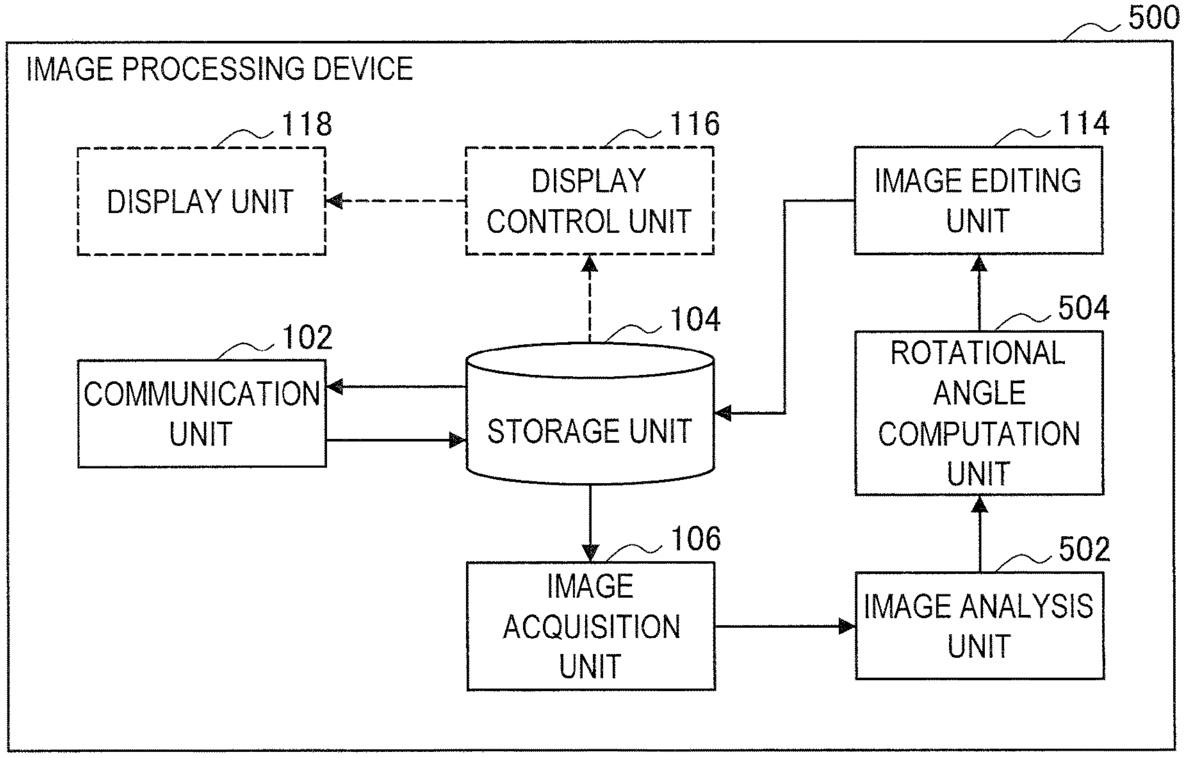
FIG. 13 is a block diagram illustrating a schematic functional configuration of an image processing device according to a fifth embodiment of the present disclosure.

FIG. 13 is a block diagram illustrating a schematic functional configuration of an image processing device according to the fifth embodiment of the present disclosure. Referring to FIG. 13, the image processing device 500 includes a communication unit 102, a storage unit 104, an image acquisition unit 106, an image analysis unit 502, a rotational angle computation unit 504, and an image editing unit 114. The image processing device 500 additionally may include a display control unit 116 and a display unit 118.

The image processing device 500 may be a terminal device such as various kinds of PCs, a tablet, a mobile phone (including a smartphone), a game console, or a media player, and may also be a server that provides a service to a terminal device via a network. The image processing device 500 is realized by the hardware configuration of an information processing device discussed later, for example. When the image processing device 500 is a server, the functions of the image processing device 500 may also be realized by the cooperative action of multiple information processing devices connected over a network. Hereinafter, each of the structural elements will be described further. Note that functional configurations similar to those described in the first embodiment above will be denoted with common signs, and thus duplicate description thereof will be reduced or omitted.

The image analysis unit 502 is realized by a CPU operating according to a program stored in memory, for example, and analyzes taken images acquired by the image acquisition unit 106. The image analysis unit 502 may analyze taken images using various established techniques. Consequently, in the present embodiment, the taken images are not necessarily 360° images taken via a fisheye lens. The taken images may also be 360° images taken using a full-perimeter camera, for example. The image analysis unit 502 executes, on such taken images, a process such as pattern analysis, for example, and detects a point at which a designated action occurred in the taken images. Alternatively, the image analysis unit 502 may also recognize an object included in the taken images. The result of such image analysis is used to compute a rotational angle of the taken images in the rotational angle computation unit 504 discussed later.

The rotational angle computation unit 504 is realized by a CPU operating according to a program stored in memory, for example, and computes a rotational angle of the taken images on the basis of a result of analysis of taken images in the image analysis unit 502. More specifically, the rotational angle computation unit 504 computes a rotational angle of the taken images so that a reference point in the taken images specified by the analysis of the taken images is positioned in a designated orientation with respect to the center of the taken images. For example, if a point at which a designated action occurred in the taken images is detected by the image analysis unit 502, the rotational angle computation unit 504 may compute a rotational angle using that point as the reference point. In this case, the rotational angle computation unit 504 may also be said to estimate that the point at which the designated action occurred is the point of regard in the taken images, and compute a rotational angle so that the point of regard comes to an easy-to-see position.

Alternatively, if an object included in the taken images is recognized by the image analysis unit 502, the rotational angle computation unit 504 may compute a rotational angle using an arbitrary point on the recognized object as the reference point. In this case, the taken images may be a series of frame images taken in chronological succession, and the rotational angle computation unit 504 may also compute a rotational angle so that the reference point is positioned in the same orientation with respect to the center of the taken images in each frame of the taken images. Note that a more specific example of such rotational angle computation will be discussed later.

(5-2. Example of Rotational Angle Computation)

A more specific example of the computation of the rotational angle of taken images by the rotational angle computation unit 504 of the image processing device 500 discussed above will be described further with reference to FIGS. 14 and 15.

Figure 14:
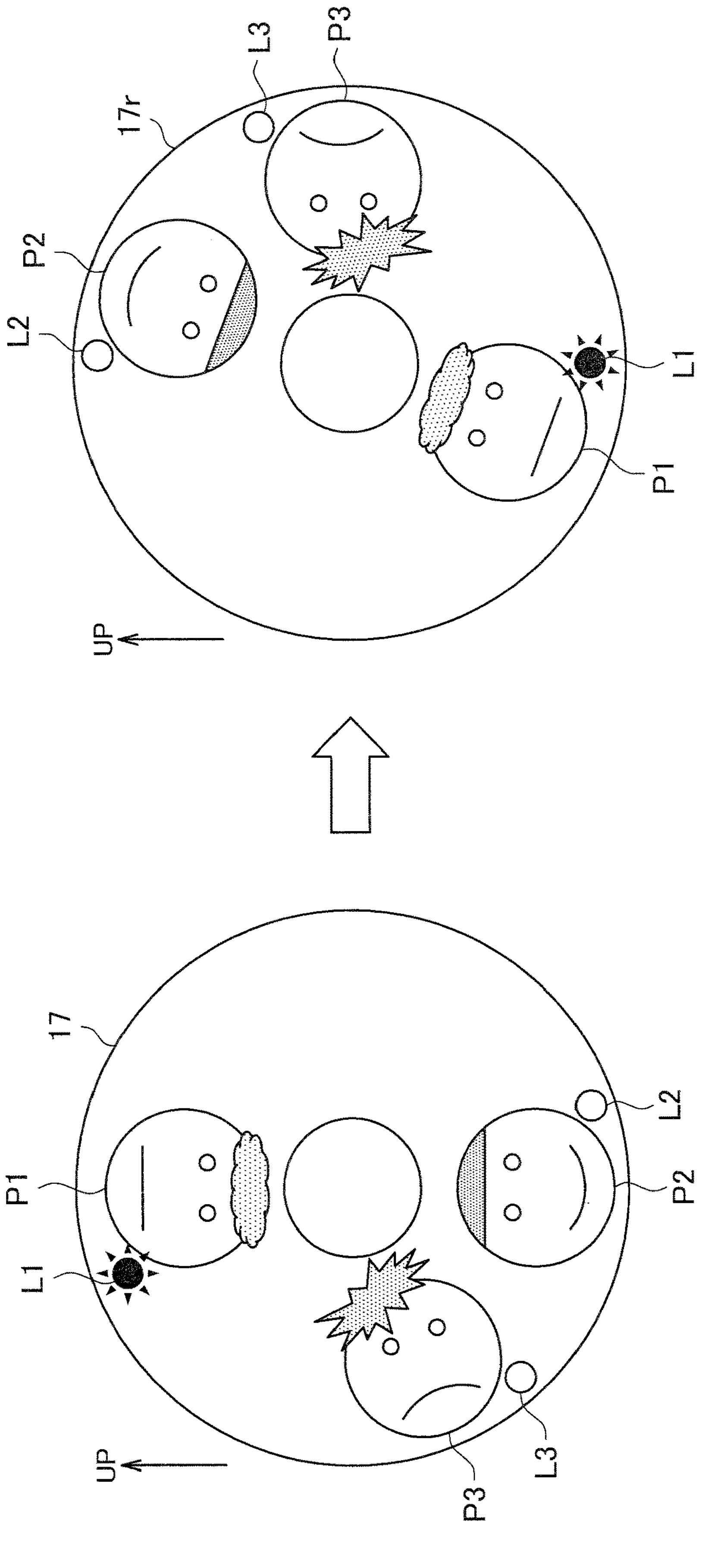
FIG. 14 is a diagram for explaining a first example of rotational angle computation for a taken image according to a fifth embodiment of the present disclosure.

FIG. 14 is a diagram for explaining a first example of rotational angle computation for a taken image according to a fifth embodiment of the present disclosure. FIG. 14 illustrates a taken image 17 including multiple users P1 to P3. Note that in the illustrated example, the taken image 17 is a 360° image taken using a full-perimeter camera, and thus no image exists in the central part of the taken image 17.

Herein, the users P1 to P3 included in the taken image 17 are participating in a meeting, for example, and one of the users P1 to P3 speaks. The taken image 17 also includes, in addition to the users P1 to P3, lamps L1 to L3 for indicating the speaking user. The lamps L1 to L3 are disposed near the users P1 to P3, such as by being worn on the clothing or the like of each user, or by being placed on a desk in front of each user, for example, and light up when the corresponding user speaks.

In the illustrated example, the user P1 is speaking, and the lamp L1 corresponding to the user P1 is lit up. The image analysis unit 502 of the imaging device 500 detects this lighting-up as a designated action, and specifies a point depicting the lamp L1 in the taken image as the point at which the action occurred, or in other words, as the estimated point of regard. The rotational angle computation unit 504 may compute a rotational angle of the taken image 17 so that this point is positioned below the center of the taken image 17. The taken image 17 rotated by the image editing unit 114 according to the computed rotational angle is labeled the taken image 17*r*. In the taken image 17*r*, the speaking user P1 may be observed in the same orientation as the real up and down.

Note that the rotational angle computation unit 504 may also compute a rotational angle so that the estimated point of regard is positioned in any orientation with respect to the center of the taken image 17, but if a rotational angle is computed so that the point of regard is positioned below as described in the foregoing, for example, the up and down of the world depicted in the taken image 17 near the point of regard matches the up and down when the taken image 17 is observed, and thus more naturally observable taken images may be provided.

In the above example, the lamps L1 to L3, which are devices installed in correspondence with the users P1 to P3, execute a designated action to indicate that a user is speaking In another example, the users P1 to P3 themselves may execute the designated action. For example, the image analysis unit 502 detects movement of a user's mouth as the designated action, and specifies a point depicting the mouth of the user whose movement was detected as the point at which the action occurred, or in other words, as the estimated point of regard.

Figure 15:
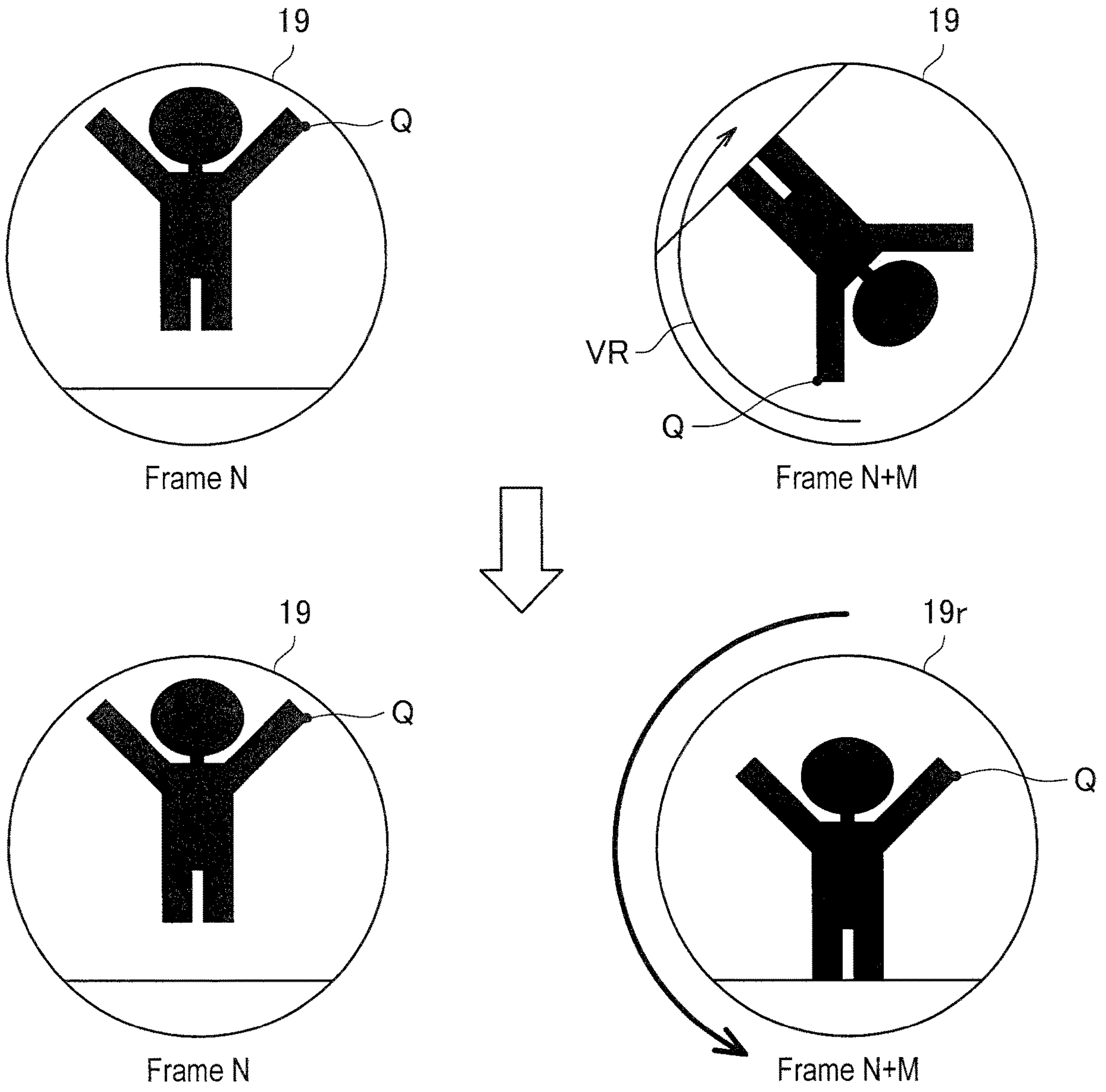
FIG. 15 is a diagram for explaining a second example of rotational angle computation for a taken image according to a fifth embodiment of the present disclosure.

FIG. 15 is a diagram for explaining a second example of rotational angle computation for a taken image according to a fifth embodiment of the present disclosure. FIG. 15 illustrates taken images 19 including users who are objects. Note that in the illustrated example, the taken images 19 are 360° images taken using a fisheye lens camera, and thus an image also exists in the central part of the taken images 19.

Herein, the taken images 19 are a series of frame images taken in chronological succession, and are also taken while rotating the camera including the fisheye lens. Consequently, the angle at which the user who is an object is depicted differs between frame N (where N=1, 2, . . . ) of the taken images 19, and frame N+M (where M=1, 2, . . . ) which follows after a designated number of frames. The rotational angle computation unit 504 configures a reference point Q on the tip of the user's left hand, and computes a rotational angle so that the reference point Q in each frame is positioned in the same orientation with respect to the center of the taken images 19.

As a result of rotating the taken images 19 according to the rotational angle, the taken image 19 of frame N+M is rotated so as to cancel the rotational vector VR between itself and frame N. Thus, in the rotated taken image 19*r* of frame N+M, the reference point Q is positioned in the upper-right with respect to the center of the image, the same as in the taken image 19 of frame N. Consequently, the observer is able to perceive the user who is an object stably as the frames advance, regardless of the rotation of the camera.

6. Sixth Embodiment

Next, a sixth embodiment of the present disclosure will be described with reference to FIGS. 16 and 17. In the present embodiment, functions similar to the image processing device 500 according to the fifth embodiment above are realized by being distributed between first and second image processing devices.

Figure 16:
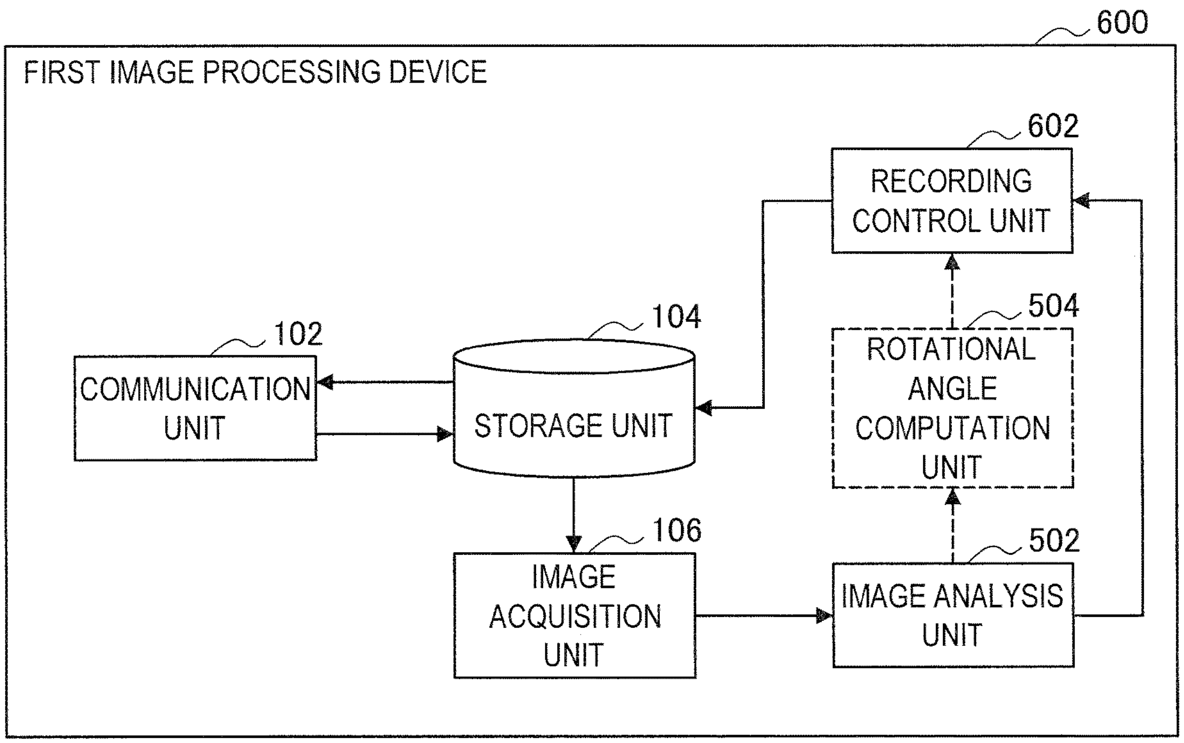
FIG. 16 is a block diagram illustrating a schematic functional configuration of a first image processing device according to a sixth embodiment of the present disclosure.
Figure 17:
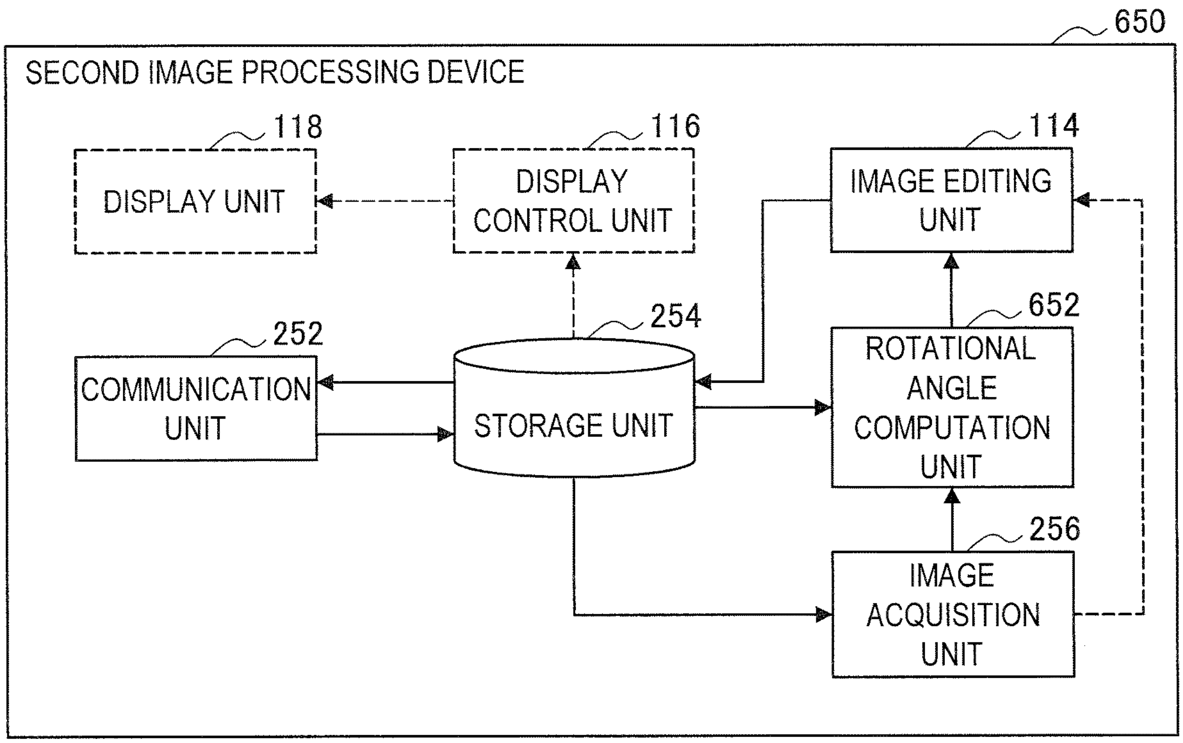
FIG. 17 is a block diagram illustrating a schematic functional configuration of a second image processing device according to a sixth embodiment of the present disclosure.

FIG. 16 is a block diagram illustrating a schematic functional configuration of a first image processing device according to the sixth embodiment of the present disclosure, and FIG. 17 is a block diagram illustrating a schematic functional configuration of a second image processing device according to the sixth embodiment of the present disclosure.

Referring to FIG. 16, the first image processing device 600 includes a communication unit 102, a storage unit 104, an image acquisition unit 106, an image analysis unit 502, and a recording control unit 602. Additionally, the first image processing device 600 may also include a rotational angle computation unit 504.

Referring to FIG. 17, the second image processing device 650 includes a communication unit 252, a storage unit 254, an image acquisition unit 256, a rotational angle computation unit 652, and an image editing unit 114. Additionally, the second image processing device 650 may also include a display control unit 116 and a display unit 118.

The first image processing device 600 and the second image processing device 650 each may be a terminal device such as various kinds of PCs, a tablet, a mobile phone (including a smartphone), a game console, or a media player, and may also be a server that provides a service to a terminal device via a network. The first image processing device 600 and the second image processing device 650 are realized by the hardware configuration of an information processing device discussed later, for example. When the first image processing device 600 or the second image processing device 650 is a server, the functions of the device may also be realized by the cooperative action of multiple information processing devices connected over a network. Hereinafter, each of the structural elements will be described further. Note that functional configurations similar to those described in the first, second, and fifth embodiments above will be denoted with common signs, and thus duplicate description thereof will be reduced or omitted.

The recording control unit 602 is realized by a CPU operating according to a program stored in memory, for example, and records, in association with taken images, metadata based on an analysis result of taken images by the image analysis unit 502. For example, the recording control unit 602 may record a position of a point at which a designated action occurred within the taken images. In addition, the recording control unit 602 may record information about an object included in the taken images. Alternatively, when the first image processing device 600 includes the rotational angle computation unit 504, the recording control unit 602 may also record a rotational angle of taken images computed by the rotational angle computation unit 504.

The rotational angle computation unit 652 may be provided when the first image processing device 600 does not include the rotational angle computation unit 504. The rotational angle computation unit 652 is realized by a CPU operating according to a program stored in memory, for example, and computes a rotational angle of taken images, similarly to the rotational angle computation unit 504 discussed above. In the present embodiment, since the image analysis unit 502 is included in the first image processing device 600, the rotational angle computation unit 652 reads out from the storage unit 254 the metadata provided together with the taken images by the first image processing device 600, and on the basis of the metadata, computes the rotational angle of the taken images.

7. Seventh Embodiment

Next, a seventh embodiment of the present disclosure will be described with reference to FIGS. 18 to 20. In the present embodiment, a point of regard in taken images is estimated on the basis of sensor data acquired together with the taken images, and the taken images are rotated so that the point of regard is positioned in a designated orientation with respect to the center of the taken images.

(7-1. Functional Configuration)

Figure 18:
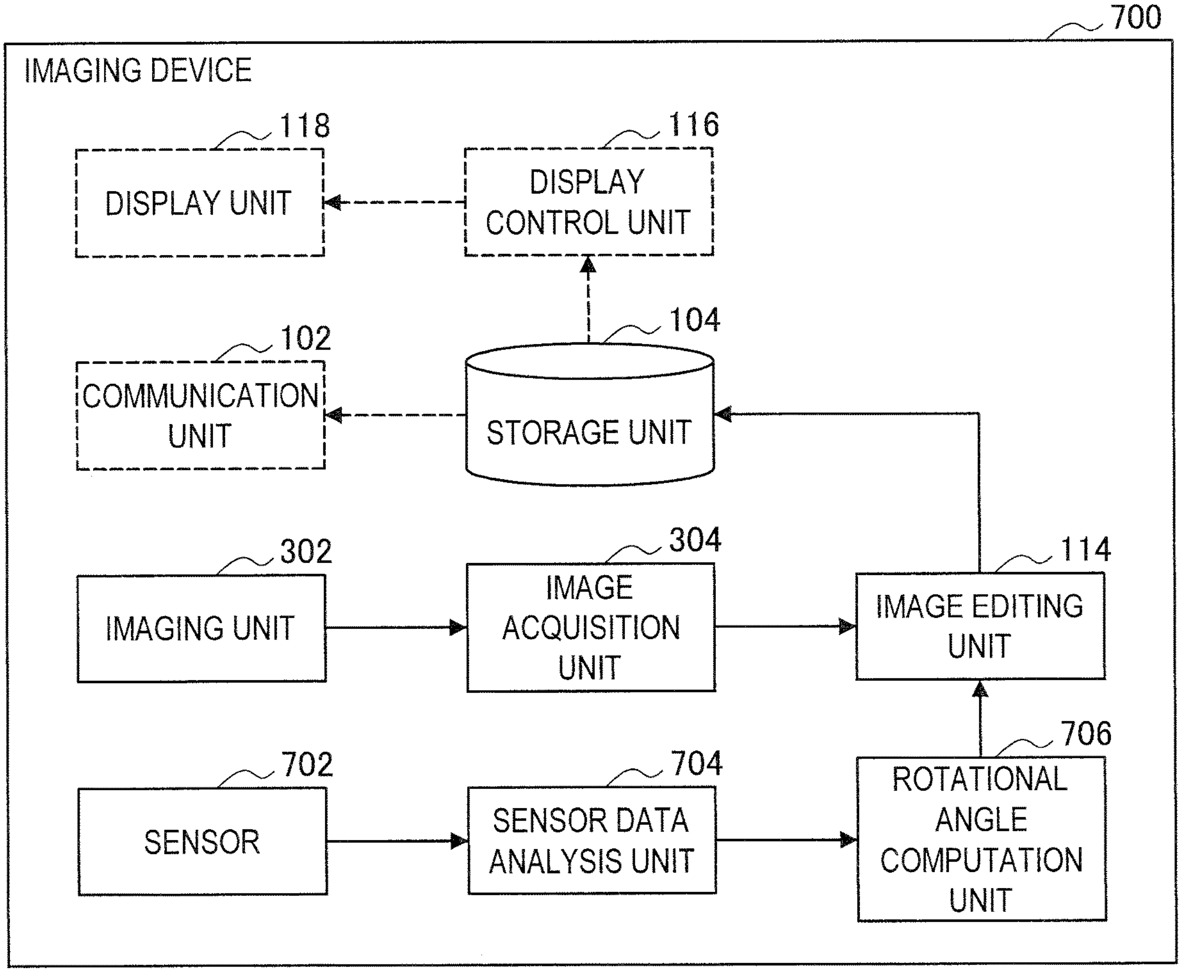
FIG. 18 is a block diagram illustrating a schematic functional configuration of an imaging device according to a seventh embodiment of the present disclosure.

FIG. 18 is a block diagram illustrating a schematic functional configuration of an imaging device according to the seventh embodiment of the present disclosure. Referring to FIG. 18, the imaging device 700 includes an imaging unit 302, an image acquisition unit 304, a sensor 702, a sensor data analysis unit 704, a rotational angle computation unit 706, an image editing unit 114, and a storage unit 104. The imaging device 700 additionally may include a communication unit 102. Also, the imaging device 700 additionally may include a display control unit 116 and a display unit 118.

In the present embodiment, the imaging device 700 is a device that executes imaging itself to acquire taken images, and edits the acquired images on the basis of sensor data. The imaging device 300 may also transmit edited images to another device via a network, store the edited images in a storage unit, or display the edited images by itself.

The imaging device 700 may be a terminal device whose primary function is an imaging function, like a digital camera, for example, but may also be a terminal device including an imaging function as an additional function, like a tablet, a mobile phone (including a smartphone), or a game console. The imaging device 700 is realized by the hardware configuration of an information processing device discussed later, for example. Hereinafter, each of the structural elements will be described further. Note that functional configurations similar to those described in the first and third embodiments above will be denoted with common signs, and thus duplicate description thereof will be reduced or omitted.

The sensor 702 is realized by various sensors, such as an acceleration sensor, a gyro sensor, a geomagnetic sensor (detecting bearing), an optical sensor, and a sound sensor (including a microphone that acquires sound data), for example. The sensor data analysis unit 704 is realized by a CPU operating according to a program stored in memory, for example, and analyzes sensor data provided by the sensor 702. The sensor data analysis unit 704 detects a sound direction of speech arriving at the imaging device 700, for example, by analysis of the sensor data. In addition, the sensor data analysis unit 704 may also detect a bearing in the taken images (for example, north, south, east, or west) by analysis of the sensor data.

The rotational angle computation unit 706 is realized by a CPU operating according to a program stored in memory, for example, and computes a rotational angle of the taken images on the basis of a result of analysis of sensor data in the sensor data analysis unit 704. More specifically, the rotational angle computation unit 706 computes a rotational angle of the taken images so that a reference point in the taken images specified by the analysis of the sensor data is positioned in a designated orientation with respect to the center of the taken images. For example, when a sound direction of speech arriving at the imaging device 700 is detected by the sensor data analysis unit 704, the rotational angle computation unit 706 may compute a rotational angle using a point in the taken images corresponding to the sound direction as the reference point. In this case, the rotational angle computation unit 706 may also be said to estimate that the point corresponding to the sound direction is the point of regard in the taken images, and compute a rotational angle so that the point of regard comes to an easy-to-see position.

Alternatively, when a bearing in the taken images is detected by the sensor data analysis unit 704, the rotational angle computation unit 706 may compute a rotational angle using a point in the taken images corresponding to a designated bearing (north, for example) as the reference point. In this case, the taken images may be a series of frame images taken in chronological succession, and the rotational angle computation unit 706 may also compute a rotational angle so that each frame of the taken images shares a common bearing.

(7-2. Example of Rotational Angle Computation)

A more specific example of the computation of the rotational angle of taken images by the rotational angle computation unit 706 of the imaging device 700 discussed above will be described further with reference to FIGS. 19 and 20.

Figure 19:
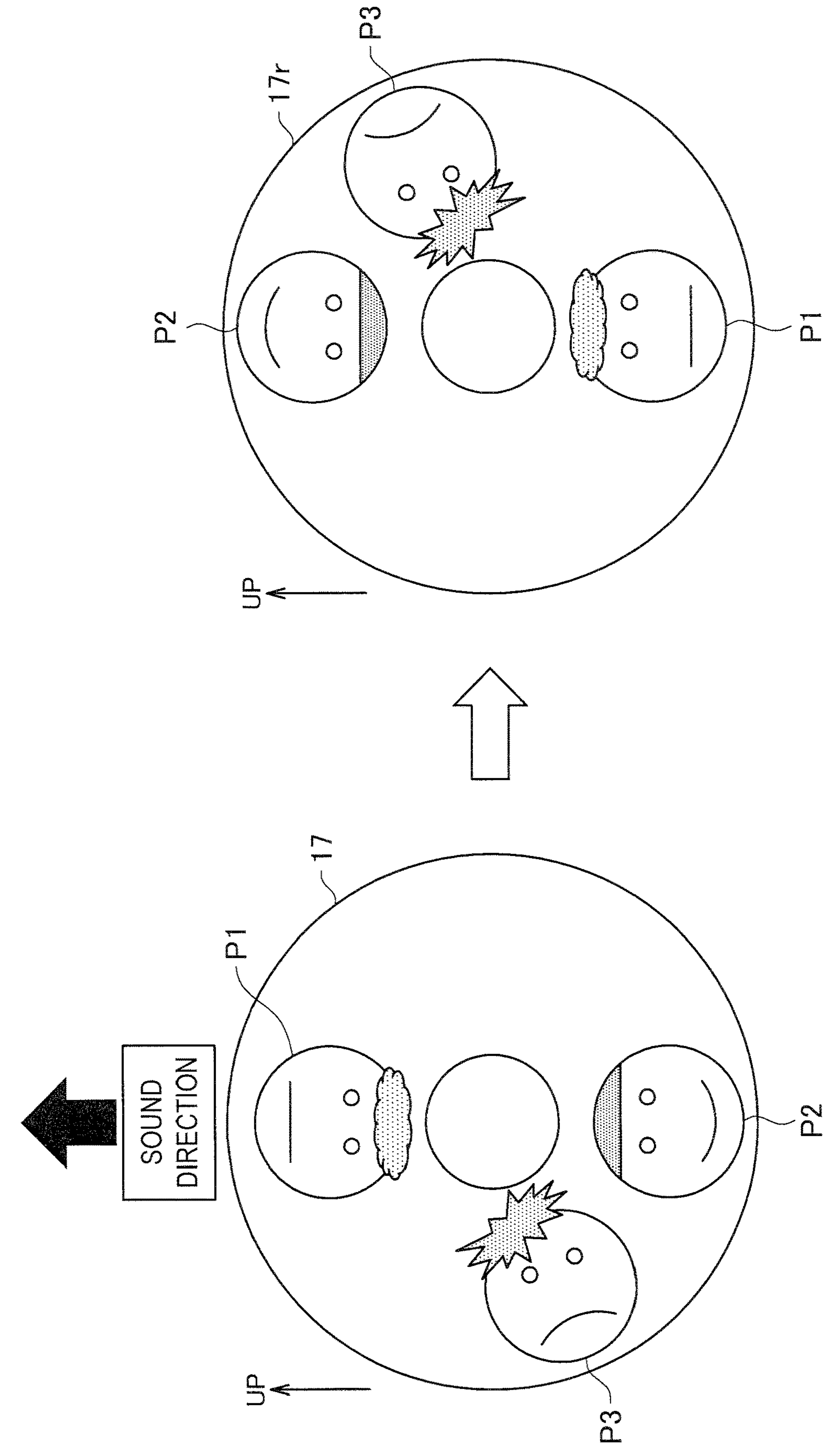
FIG. 19 is a diagram for explaining a first example of rotational angle computation for a taken image according to a seventh embodiment of the present disclosure.

FIG. 19 is a diagram for explaining a first example of rotational angle computation for a taken image according to a seventh embodiment of the present disclosure. FIG. 19 illustrates a taken image 17 including multiple users P1 to P3. Note that in the illustrated example, the taken image 17 is a 360° image taken using a full-perimeter camera, and thus no image exists in the central part of the taken image 17.

Herein, the users P1 to P3 included in the taken image 17 are participating in a meeting, for example, and one of the users P1 to P3 speaks. The speech spoken by the user arrives at the imaging device 700, and is detected by a microphone included in the sensor 702. The sensor data analysis unit 704 detects the sound direction of the detected speech by analysis of the speech data provided by the microphone.

In the illustrated example, the user P1 is speaking, and the direction in which the user P1 is present becomes the sound direction. The sensor data analysis unit 704 detects the sound direction. The rotational angle computation unit 706 may estimate that a point in the taken image corresponding to the detected sound direction is the point of regard in the taken image, and compute a rotational angle of the taken image 17 so that this point is positioned below the center of the taken image 17. The taken image 17 rotated by the image editing unit 114 according to the computed rotational angle is labeled the taken image 17*r*. In the taken image 17*r*, the speaking user P1 may be observed in the same orientation as the real up and down.

Note that the rotational angle computation unit 706 may also compute a rotational angle so that the estimated point of regard is positioned in any orientation with respect to the center of the taken image 17, but if a rotational angle is computed so that the point of regard is positioned below as described in the foregoing, for example, the up and down of the world depicted in the taken image 17 near the point of regard matches the up and down when the taken image 17 is observed, and thus more naturally observable taken images may be provided.

Figure 20:
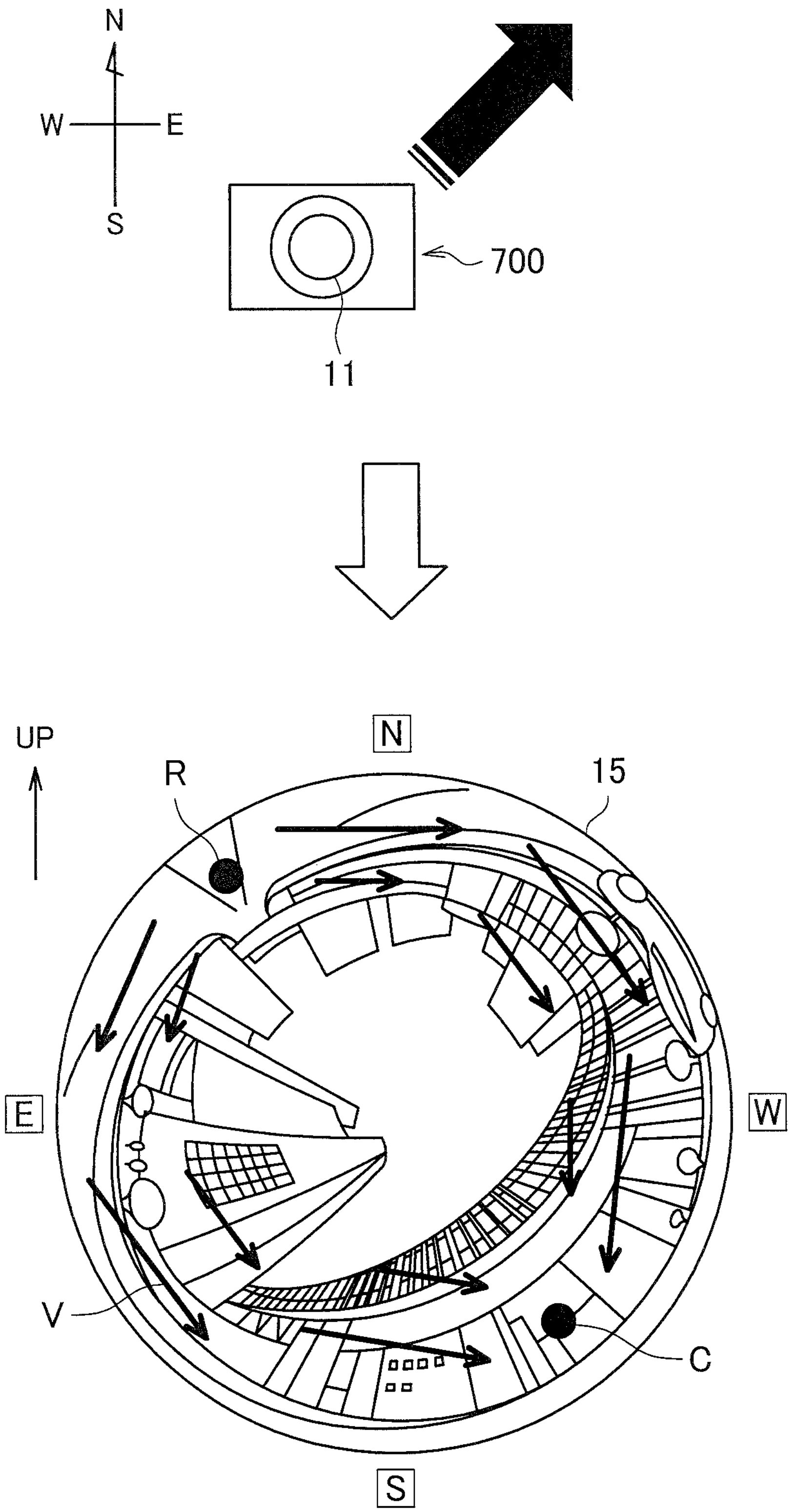
FIG. 20 is a diagram for explaining a second example of rotational angle computation for a taken image according to a seventh embodiment of the present disclosure.

FIG. 20 is a diagram for explaining a second example of rotational angle computation for a taken image according to a seventh embodiment of the present disclosure. FIG. 20 illustrates an example of a taken image 15 taken by pointing the imaging device 700 in a vertical direction. The imaging device 700 includes the fisheye lens 11 included in the imaging unit 302, and the optical axis direction of the fisheye lens 11 is an approximately vertical direction. In addition, the imaging device 700 is moving in an approximately horizontal direction, or in other words a direction perpendicular to the optical axis direction of the fisheye lens 11.

Herein, the imaging device 700 detects bearing with a geomagnetic sensor included in the sensor 702. The sensor data analysis unit 704 detects the bearing in the taken image 15 (north (N), south (S), east (E), west (W)) by analysis of the sensor data provided by the geomagnetic sensor. According to the detection result, the taken image 15 is being taken while moving the imaging device 700 in a north-east direction. The rotational angle computation unit 706 may treat a point in the taken image corresponding to a designated bearing in the taken image 15, in this case north (N), as the reference point, and compute a rotational angle of the taken image 15 so that this point is positioned below the center of the taken image 15.

By having the image editing unit 114 rotate the taken image according to the rotational angle computed in this way, the taken image 15 is displayed with north at the top, regardless of the movement direction of the imaging device 700, for example. Consequently, the observer may recognize, from the taken image 15, what lies in which direction from the imaging device 700, for example. In addition, when the taken image 15 is taken while the imaging device 700 is moving, the movement direction of the imaging device 700 may also be recognized from the taken image 15.

8. Eighth Embodiment

Next, an eighth embodiment of the present disclosure will be described with reference to FIGS. 21 and 22. In the present embodiment, functions similar to the imaging device 700 according to the seventh embodiment above are realized by being distributed between an imaging device and an image processing device.

Figure 21:
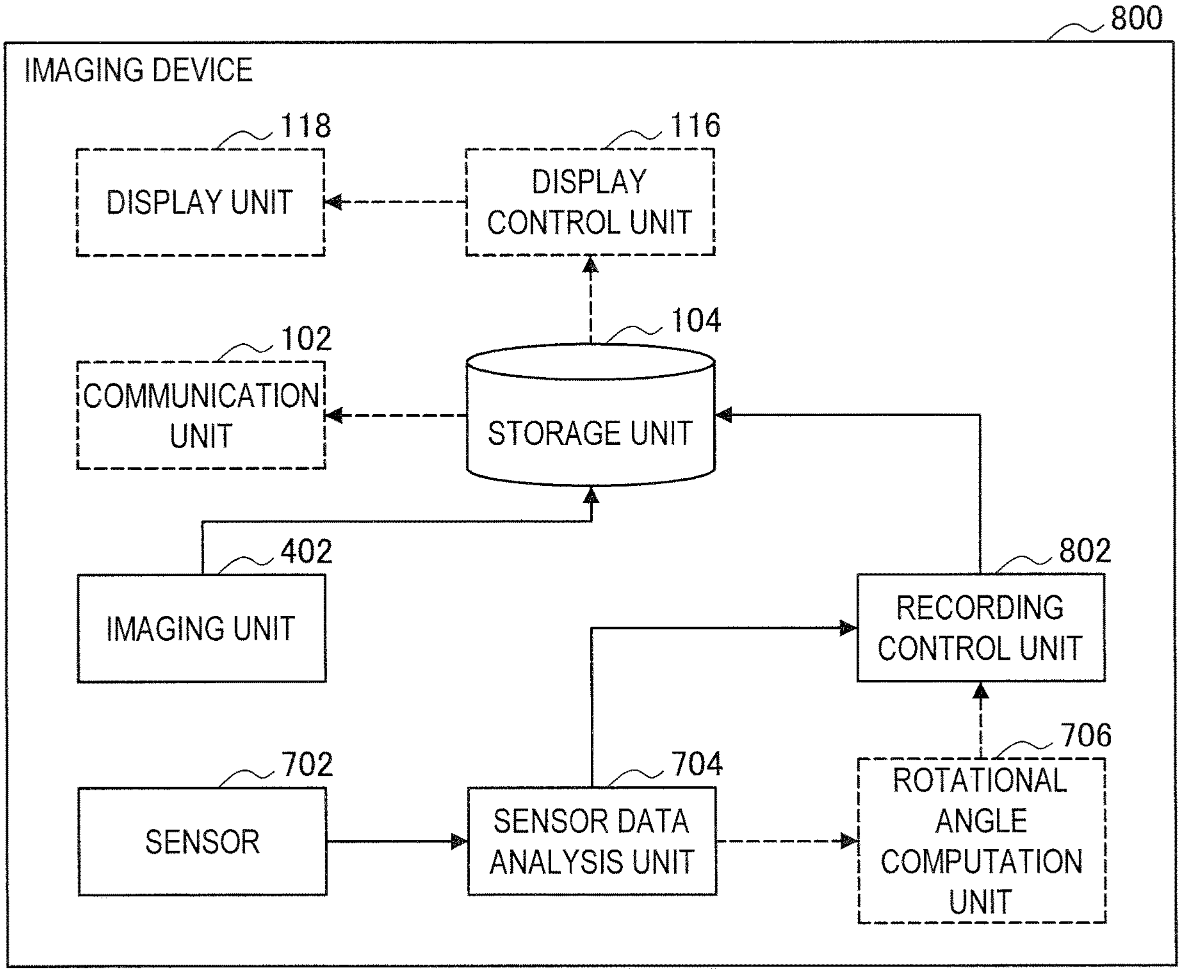
FIG. 21 is a block diagram illustrating a schematic functional configuration of an image processing device according to an eighth embodiment of the present disclosure.
Figure 22:
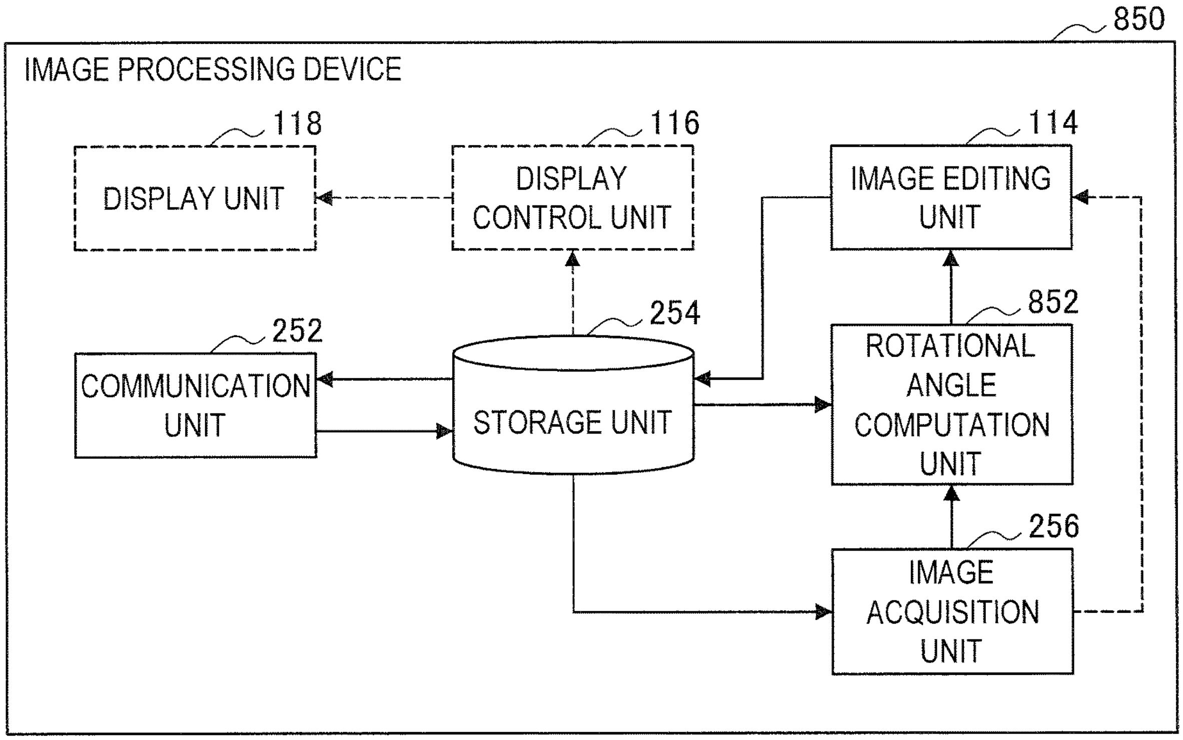
FIG. 22 is a block diagram illustrating a schematic functional configuration of an image processing device according to an eighth embodiment of the present disclosure.

FIG. 21 is a block diagram illustrating a schematic functional configuration of an image processing device according to the eighth embodiment of the present disclosure, and FIG. 22 is a block diagram illustrating a schematic functional configuration of an image processing device according to the eighth embodiment of the present disclosure.

Referring to FIG. 21, the imaging device 800 includes an imaging unit 402, a storage unit 104, a sensor 702, a sensor data analysis unit 704, and a recording control unit 802. The imaging device 800 additionally may include a communication unit 102 or a rotational angle computation unit 706. Also, the imaging device 800 additionally may include a display control unit 116 and a display unit 118.

In the present embodiment, the imaging device 800 is a device that executes imaging itself to acquire taken images, and records the acquired images together with metadata based on sensor data. The imaging device 800 transfers images with associated metadata to the image processing device 850 via a removable recording medium included in the storage unit 104, or transmits images with associated metadata to the image processing device 850 from the communication unit 102 via a network.

Referring to FIG. 22, the image processing device 850 includes a communication unit 252, a storage unit 254, an image acquisition unit 256, a rotational angle computation unit 852, and an image editing unit 114. Additionally, the image processing device 850 may also include a display control unit 116 and a display unit 118.

In the present embodiment, the image processing device 850 is a device that acquires images with associated metadata from the imaging device 800 via the network, and edits the acquired images according to the metadata. The image processing device 850 may also transmit edited images to another device via a network, store the edited images in a storage unit, or display the edited images by itself.

The imaging device 800 may be a terminal device whose primary function is an imaging function, like a digital camera, for example, but may also be a terminal device including an imaging function as an additional function, like a tablet, a mobile phone (including a smartphone), or a game console. Also, the image processing device 850 may be a terminal device such as various kinds of PCs, a tablet, a mobile phone (including a smartphone), a game console, or a media player, and may also be a server that provides a service to a terminal device via a network. The imaging device 800 and the image processing device 850 are realized by the hardware configuration of an information processing device discussed later, for example. When the image processing device 850 is a server, the functions of the image processing device 850 may also be realized by the cooperative action of multiple information processing devices connected over a network. Hereinafter, each of the structural elements will be described further. Note that functional configurations similar to those described in the first, second, fourth, and seventh embodiments above will be denoted with common signs, and thus duplicate description thereof will be reduced or omitted.

The recording control unit 802 is realized by a CPU operating according to a program stored in memory, for example, and records, in association with taken images, metadata based on an analysis result of sensor data by the sensor data analysis unit 704. For example, the recording control unit 802 may record a sound direction of sound arriving at the imaging device 800, or the position of a point within the taken images corresponding to the sound direction. In addition, the recording control unit 802 may record a bearing in the taken images. Alternatively, when the imaging device 800 includes the rotational angle computation unit 706, the recording control unit 802 may also record a rotational angle of taken images computed by the rotational angle computation unit 706.

The rotational angle computation unit 852 may be provided when the imaging device 800 does not include the rotational angle computation unit 706. The rotational angle computation unit 852 is realized by a CPU operating according to a program stored in memory, for example, and computes a rotational angle of taken images, similarly to the rotational angle computation unit 706 discussed above. In the present embodiment, since the sensor data analysis unit 704 is included in the imaging device 800, the rotational angle computation unit 852 reads out from the storage unit 254 the metadata provided together with the imaging device by the imaging device 800, and on the basis of the metadata, computes the rotational angle of the taken images.

9. Hardware Configuration

Figure 23:
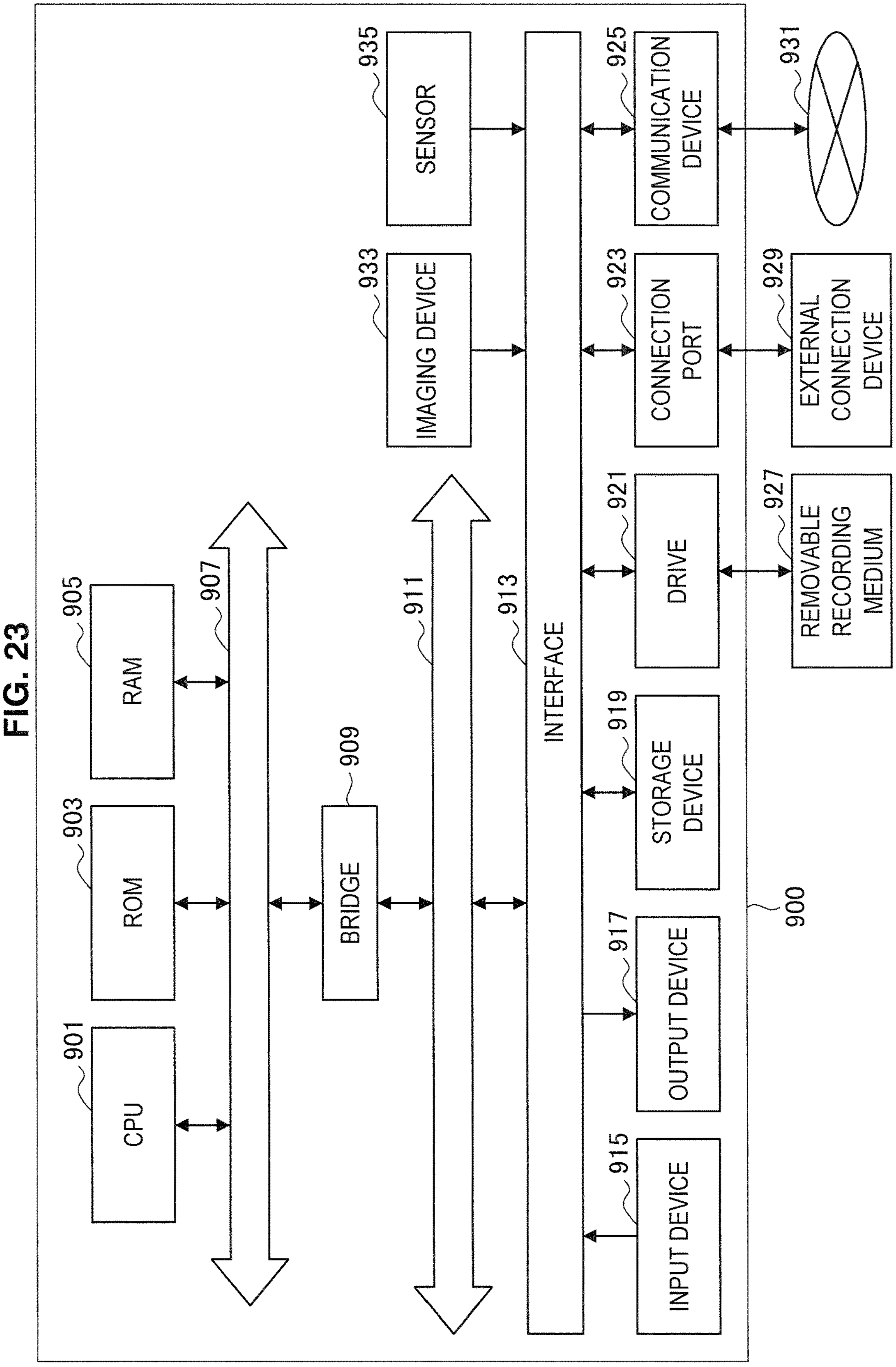
FIG. 23 is a block diagram for describing a hardware configuration of an information processing device.

Next, a hardware configuration of an information processing device according to an embodiment of the present disclosure will be described with reference to FIG. 23. FIG. 23 is a block diagram for describing a hardware configuration of an information processing device. An illustrated information processing device 900 may implement, for example, the image processing apparatus (including the first image processing apparatus and the second image processing apparatus) and the imaging apparatus in the above-described embodiments.

The information processing device 900 includes a central processing unit (CPU) 901, read only memory (ROM) 903, and random access memory (RAM) 905. In addition, the information processing device 900 may include a host bus 907, a bridge 909, an external bus 911, an interface 913, an input device 915, an output device 917, a storage device 919, a drive 921, a connection port 923, and a communication device 925. Further, the information processing device 900 may include an imaging device 933 and a sensor 935 as necessary. The information processing device 900 may include a processing circuit called as a digital signal processor (DSP) or an application specific integrated circuit (ASIC) instead of or in addition to the CPU 901.

The CPU 901 functions as an operation processor and a controller, and controls all or some operations in the information processing device 900 in accordance with a variety of programs recorded on the ROM 903, the RAM 905, the storage device 919, or a removable recording medium 927. The ROM 903 stores a program, an operation parameter, and the like which are used by the CPU 901. The RAM 905 primarily stores a program which is used in the execution of the CPU 901 and a parameter which is appropriately modified in the execution. The CPU 901, the ROM 903, and the RAM 905 are connected to each other by the host bus 907 including an internal bus such as a CPU bus. In addition, the host bus 907 is connected to the external bus 911 such as a peripheral component interconnect/interface (PCI) bus via the bridge 909.

The input device 915 is a device which is operated by a user, such as a mouse, a keyboard, a touch panel, a button, a switch, and a lever. The input device 915 may be, for example, a remote control device using infrared light or other radio waves, or may be an external connection device 929 such as a mobile phone operable in response to the operation of the information processing device 900. The input device 915 includes an input control circuit which generates an input signal on the basis of information input by a user and outputs the input signal to the CPU 901. By operating the input device 915, a user inputs various types of data to the information processing device 900 or requires a processing operation.

The output device 917 includes a device capable of visually or audibly notifying the user of acquired information. The output device 917 may be a display device such as a liquid crystal display (LCD), a plasma display panel (PDP), and an organic electro-luminescence (EL) display, an audio output device such as a speaker and a headphone, a printer device, or the like. The output device 917 may output a result obtained from the processing of the information processing device 900 in a form of a video such as text and an image, and an audio such as voice and sound.

The storage device 919 is a device for data storage which is configured as an example of a storage unit of the information processing device 900. The storage device 919 includes, for example, a magnetic storage device such as a hard disk drive (HDD), a semiconductor storage device, an optical storage device, or a magneto-optical storage device. The storage device 919 stores a program to be executed by the CPU 901, various types of data, various types of data acquired from the outside, and the like.

The drive 921 is a reader/writer for the removable recording medium 927 such as a magnetic disk, an optical disc, a magneto-optical disk, and a semiconductor memory, and is built in the information processing device 900 or externally attached thereto. The drive 921 reads out information recorded in the removable recording medium 927 attached thereto, and outputs the read-out information to the RAM 905. Further, the drive 921 writes record in the removable recording medium 927 attached thereto.

The connection port 923 is a port used to directly connect a device to the information processing device 900. The connection port 923 may include, for example, a universal serial bus (USB) port, an IEEE1394 port, and a small computer system interface (SCSI) port. The connection port 923 may further include an RS-232C port, an optical audio terminal, a high-definition multimedia interface (HDMI) (registered trademark) port, and so on. The connection of the external connection device 929 to the connection port 923 makes it possible to exchange various types of data between the information processing device 900 and the external connection device 929.

The communication device 925 is, for example, a communication interface including a communication device or the like for a connection to a communication network 931. The communication device 925 may be, for example, a communication card for a wired or wireless local area network (LAN), Bluetooth (registered trademark), a wireless USB (WUSB) or the like. In addition, the communication device 925 may be a router for optical communication, a router for an asymmetric digital subscriber line (ADSL), a modem for various kinds of communication, or the like. The communication device 925 transmits a signal to and receives a signal from, for example, the Internet or other communication devices on the basis of a predetermined protocol such as TCP/IP. In addition, the communication network 931 connected to the communication device 925 may be a network connected in a wired or wireless manner, and is, for example, the Internet, a home LAN, infrared communication, radio wave communication, satellite communication, or the like.

The imaging device 933 is a device that generates a captured image by shooting an image of real space using an image sensor such as a charge coupled device (CCD) or complementary metal oxide semiconductor (CMOS), as well as various members such as a lens for controlling the formation of an object image on the image sensor, for example. The imaging device 933 may be a device that shoots a still image, and may also be a device that shoots a moving image.

The sensor 935 includes various sensors such as an acceleration sensor, a gyro sensor, a geomagnetic sensor, an optical sensor, and an audio sensor. The sensor 935 acquires information on a state of the information processing device 900, such as the posture of the case of the information processing device 900, and information on an environment around the information processing device 900, such as the brightness and noise around the information processing device 900. The sensor 935 may also include a global positioning system (GPS) sensor that receives GPS signals and measures the latitude, longitude, and altitude of the device.

The example of the hardware configuration of the information processing device 900 has been described so far. Each of the above-described structural elements may be configured using a general-purpose member, and may also be configured using hardware specialized in the function of each structural element. Such a configuration may also be modified as appropriate in accordance with the technological level at the time of the implementation.

10. Supplement

The embodiments of the present disclosure may include, for example, an information processing device (an image processing apparatus (including the first image processing apparatus and the second image processing apparatus) or an imaging apparatus) as described above, a system including a plurality of information processing apparatuses, an information processing method executed by the information processing device or the system, a program for causing the information processing device to function, and a non-transitory tangible media having the program recorded thereon.

The preferred embodiments of the present invention have been described above with reference to the accompanying drawings, whilst the present invention is not limited to the above examples, of course. A person skilled in the art may find various alterations and modifications within the scope of the appended claims, and it should be understood that they will naturally come under the technical scope of the present invention.

Additionally, the present technology may also be configured as below.

(1)

An image processing device including:

an image acquisition unit that acquires a 360° image; and a rotational angle computation unit that computes a rotational angle of the 360° image in a manner that a reference point included in the 360° image is positioned in a designated orientation with respect to a center of the 360° image.

(2)

The image processing device according to (1), wherein the rotational angle computation unit computes the rotational angle using a point of regard estimated in the 360° image as the reference point.

(3)

The image processing device according to (2), wherein the rotational angle computation unit estimates the point of regard on a basis of an analysis result of the 360° image.

(4)

The image processing device according to (3), wherein the image acquisition unit acquires the 360° image taken in chronological succession via a fisheye lens, and the rotational angle computation unit estimates that a point of origin of motion vectors in the 360° image is the point of regard.

(5)

The image processing device according to (4), wherein when the point of origin is detected in a peripheral portion of the 360° image, the rotational angle computation unit estimates that the point of origin is the point of regard.

(6)

The image processing device according to (3), wherein the rotational angle computation unit estimates that a point at which a designated action occurred in the 360° image is the point of regard.

(7)

The image processing device according to (6), wherein the image acquisition unit acquires the 360° image including a plurality of users, and the rotational angle computation unit estimates that a point at which the designated action indicating a user who is speaking from among the plurality of users occurred is the point of regard.

(8)

The image processing device according to (7), wherein the designated action is executed by each of the users themselves or by a device installed in correspondence with each of the users.

(9)

The image processing device according to (2), wherein the rotational angle computation unit estimates the point of regard on a basis of sensor data acquired together with the 360° image.

(10)

The image processing device according to (9), wherein the rotational angle computation unit estimates that a point in the 360° image corresponding to a sound direction indicated by sound data acquired together with the 360° image is the point of regard.

(11)

The image processing device according to any one of (1) to (10), wherein the rotational angle computation unit computes the rotational angle in a manner that the reference point is positioned below the center of the 360° image.

(12)

The image processing device according to any one of (1) to (11), wherein the image acquisition unit acquires the 360° image taken via a fisheye lens.

(13)

The image processing device according to (1), wherein the rotational angle computation unit computes the rotational angle using a point in the 360° image corresponding to a designated bearing indicated by bearing data acquired together with the 360° image as the reference point.

(14)

The image processing device according to (1), wherein the rotational angle computation unit computes the rotational angle using a point on an object in the 360° image as the reference point.

(15)

The image processing device according to (14), wherein the image acquisition unit acquires the 360° image taken in chronological succession, and the rotational angle computation unit computes the rotational angle in a manner that the reference point in each frame of the 360° image is positioned in the same orientation with respect to the center of the 360° image.

(16)

The image processing device according to (1), wherein the image acquisition unit acquires the 360° image taken in chronological succession via a fisheye lens, and when a point of origin and a point of convergence of motion vectors are both detected in the 360° image, the rotational angle computation unit computes the rotational angle in a manner that a direction joining the point of origin and the point of convergence matches a designated direction.

(17)

The image processing device according to any one of (1) to (16), further including:

an image editing unit that rotates the 360° image according to the computed rotational angle.

(18)

The image processing device according to any one of (1) to (16), further including:

a recording control unit that records the computed rotational angle in association with the 360° image.

(19)

An image processing method including:

acquiring a 360° image; and computing, by a processor, a rotational angle of the 360° image in a manner that a reference point included in the 360° image is positioned in a designated orientation with respect to a center of the 360° image.

(20)

A program causing a computer to realize:

a function of acquiring a 360° image; and a function of a processor computing a rotational angle of the 360° image in a manner that a reference point included in the 360° image is positioned in a designated orientation with respect to a center of the 360° image.

REFERENCE SIGNS LIST

100, 450, 500, 850 image processing device
102, 252 communication unit
104, 254 storage unit
106, 256, 304 image acquisition unit
108 vector computation unit
110 point detection unit
112, 258, 504, 652, 706, 852 rotational angle computation unit
114 image editing unit
200, 600 first image processing device
202, 602, 802 recording control unit
250, 650 second image processing device
300, 400, 700, 800 imaging device
302, 402 imaging unit
502 image analysis unit
702 sensor
704 sensor data analysis unit

The invention claimed is:

1. An image processing device, comprising:

one or more processors configured to:

acquire a 360° image from an imaging device, wherein the 360° image is captured by the imaging device that is in motion;

detect a point of origin and a point of convergence in a peripheral portion of the 360° image, wherein the point of origin of the 360° image is a reference point and the 360° image converges at the point of convergence;

estimate a movement of the imaging device from the point of convergence towards the point of origin based on the detection of the point of origin and the point of convergence;

acquire the 360° image in a chronological succession via a fisheye lens;

determine a point of regard in the 360° image based on an analysis of the 360° image;

determine the point of regard as the point of origin in the 360° image based on the point of origin that is in the peripheral portion of the 360° image;

compute a rotational angle of the 360° image, based on the estimated movement of the imaging device and based on the point of regard as the reference point, such that the point of origin in the 360° image is positioned in a designated orientation with respect to a center of the 360° image; and rotate the 360° image by the computed rotational angle.

2. The image processing device according to claim 1, wherein the one or more processors are further configured to determine a point, at which a designated action occurred in the 360° image, as the point of regard.

3. The image processing device according to claim 2, wherein the one or more processors are further configured to:

acquire the 360° image that comprises a plurality of users, wherein the designated action indicates a speaking action of a user among the plurality of users.

4. The image processing device according to claim 3, wherein the designated action is executed by at least one user of the plurality of users or by an external device installed corresponding to each user of the plurality of users.

5. The image processing device according to claim 1, wherein the one or more processors are further configured to:

acquire sensor data from the imaging device; and determine the point of regard based on the sensor data.

6. The image processing device according to claim 5, wherein the sensor data comprises sound data that indicates a sound direction, and the one or more processors are further configured to determine the point of regard in the 360° image based on the sound direction.

7. The image processing device according to claim 1, wherein the one or more processors are further configured to compute the rotational angle such that the reference point is positioned below the center of the 360° image.

8. The image processing device according to claim 1, wherein the one or more processors are further configured to:

acquire, from the imaging device, bearing data that indicates a designated bearing; and compute the rotational angle of the 360° image based on the reference point, wherein the reference point corresponds to the designated bearing.

9. The image processing device according to claim 1, wherein the one or more processors are further configured to compute the rotational angle of the 360° image based on the reference point, and the reference point is a point on an object in the 360° image.

10. The image processing device according to claim 9, wherein the one or more processors are further configured to:

acquire a plurality of 360° images, captured via the fisheye lens in the chronological succession, as a series of frame images; and compute the rotational angle such that the reference point, in each frame image of the series of frame images, is positioned in a same orientation with respect to the center of the 360° image.

11. The image processing device according to claim 1, wherein the one or more processors are further configured to compute the rotational angle such that a direction that joins the point of origin and the point of convergence matches a designated direction, wherein the designated direction is a direction from the point of origin towards the point of convergence.

12. The image processing device according to claim 1, wherein the one or more processors are further configured to record the rotational angle of the 360° image.

13. An image processing method, comprising:

in an image processing device:

acquiring a 360° image from an imaging device, wherein the 360° image is captured by the imaging device that is in motion;

detecting a point of origin and a point of convergence in a peripheral portion of the 360° image, wherein the point of origin of the 360° image is a reference point and the 360° image converges at the point of convergence;

estimating a movement of the imaging device from the point of convergence towards the point of origin based on the detection of the point of origin and the point of convergence;

acquiring the 360° image in a chronological succession via a fisheye lens;

determining a point of regard in the 360° image based on an analysis of the 360° image;

determining the point of regard as the point of origin in the 360° image based on the point of origin that is in the peripheral portion of the 360° image;

computing a rotational angle of the 360° image, based on the estimated movement of the imaging device and based on the point of regard as the reference point, such that the point of origin in the 360° image is positioned in a designated orientation with respect to a center of the 360° image; and rotating the 360° image by the computed rotational angle.

14. A non-transitory computer-readable medium having stored thereon, computer-executable instructions, which when executed by a computer, cause the computer to execute operations, the operations comprising:

acquiring a 360° image from an imaging device, wherein the 360° image is captured by the imaging device that is in motion;

detecting a point of origin and a point of convergence in a peripheral portion of the 360° image, wherein the point of origin of the 360° image is a reference point and the 360° image converges at the point of convergence;

estimating a movement of the imaging device from the point of convergence towards the point of origin based on the detection of the point of origin and the point of convergence;

acquiring the 360° image in a chronological succession via a fisheye lens;

determining a point of regard in the 360° image based on an analysis of the 360° image;

determining the point of regard as the point of origin in the 360° image based on the point of origin that is in the peripheral portion of the 360° image;

computing a rotational angle of the 360° image, based on the estimated movement of the imaging device and based on the point of regard as the reference point, such that the point of origin in the 360° image is positioned in a designated orientation with respect to a center of the 360° image; and rotating the 360° image by the computed rotational angle.

* * * * *